United States Patent
Onishi et al.

(10) Patent No.: US 11,309,611 B2
(45) Date of Patent: Apr. 19, 2022

(54) BATTERY MOUNTING UNIT, ELECTRIC DEVICE, AND POWER SUPPLY UNIT

(71) Applicants: THE FURUKAWA BATTERY CO., LTD., Yokohama (JP); NILEWORKS INC., Tokyo (JP)

(72) Inventors: Yuta Onishi, Otokuni-gun (JP); Akino Isa, Otokuni-gun (JP); Hitoshi Watanabe, Otokuni-gun (JP); Masanori Yamakata, Otokuni-gun (JP); Hiroshi Yanagishita, Tokyo (JP); Chihiro Wake, Tokyo (JP)

(73) Assignees: THE FURUKAWA BATTERY CO., LTD., Yokohama (JP); NILEWORKS INC., Tokyo (JP)

( * ) Notice: Subject to any disclaimer, the term of this patent is extended or adjusted under 35 U.S.C. 154(b) by 242 days.

(21) Appl. No.: 16/644,767

(22) PCT Filed: Oct. 9, 2018

(86) PCT No.: PCT/JP2018/037523
§ 371 (c)(1),
(2) Date: Mar. 5, 2020

(87) PCT Pub. No.: WO2019/073949
PCT Pub. Date: Apr. 18, 2019

(65) Prior Publication Data
US 2020/0295327 A1    Sep. 17, 2020

(30) Foreign Application Priority Data

Oct. 10, 2017 (JP) .............................. JP2017-196525
Mar. 20, 2018 (JP) .............................. JP2018-052129
Sep. 13, 2018 (JP) .............................. JP2018-171081

(51) Int. Cl.
*H01M 50/244* (2021.01)
*B60L 50/64* (2019.01)
(Continued)

(52) U.S. Cl.
CPC ........... *H01M 50/244* (2021.01); *B60L 50/64* (2019.02); *B60L 53/80* (2019.02); *H01M 50/20* (2021.01);
(Continued)

(58) Field of Classification Search
None
See application file for complete search history.

(56) References Cited

U.S. PATENT DOCUMENTS

2004/0058231 A1* 3/2004 Takeshita ............ H01M 10/486
429/123
2008/0182163 A1  7/2008 Xiao et al.
(Continued)

FOREIGN PATENT DOCUMENTS

CN        1182902 A      5/1998
CN      101232083 A      7/2008
(Continued)

OTHER PUBLICATIONS

Nov. 27, 2018 International Search Report issued in International Patent Application No. PCT/JP2018/037523.
(Continued)

*Primary Examiner* — Gregg Cantelmo
(74) *Attorney, Agent, or Firm* — Oliff PLC

(57) ABSTRACT

A battery mount from which a battery device is attachable and detachable results in a configuration that enables easy attachment and detachment of a battery having various shapes. The battery mount includes: connection terminals configured to fit to external terminals of the battery and having a shape along which the external terminals are slidable in at least one direction; and a lever rotatable about a fulcrum and located at a side at which the connection terminals are located when seen from the battery in a state where the external terminals are fitted to the connection (Continued)

terminals. The external terminals are configured to be elastically deformable to fit to the connection terminals by sandwiching the connection terminals therein.

20 Claims, 30 Drawing Sheets

(51) Int. Cl.
    *B60L 53/80*     (2019.01)
    *H01M 50/20*     (2021.01)
    *H01M 50/209*     (2021.01)
    *H01M 50/249*     (2021.01)
    *H01M 50/543*     (2021.01)
    *H01M 50/296*     (2021.01)

(52) U.S. Cl.
    CPC ....... *H01M 50/209* (2021.01); *H01M 50/249* (2021.01); *H01M 50/296* (2021.01); *H01M 50/543* (2021.01); *H01M 2220/20* (2013.01)

(56) References Cited

U.S. PATENT DOCUMENTS

2012/0145852 A1*   6/2012   Chiang ................... B62M 6/90
                                                      248/224.8
2015/0249235 A1   9/2015   Kawashima
2017/0317321 A1   11/2017   Kawashima

FOREIGN PATENT DOCUMENTS

| | | |
|---|---|---|
| CN | 107195814 A | 9/2017 |
| JP | S45-017617 Y1 | 7/1970 |
| JP | S49-001705 Y1 | 1/1974 |
| JP | H05-160757 A | 6/1993 |
| JP | H08-303427 A | 11/1996 |
| JP | H09-027309 A | 1/1997 |
| JP | H10-070595 A | 3/1998 |
| JP | H10-144274 A | 5/1998 |
| JP | H10-161775 A | 6/1998 |
| JP | 2003-045386 A | 2/2003 |
| JP | 2007-123179 A | 5/2007 |
| JP | 2017-73838 A | 4/2017 |
| KR | 10-2006-9005650 A | 1/2006 |
| KR | 20110090730 A | 8/2011 |
| WO | 2013/027595 A1 | 2/2013 |
| WO | 2015/194403 A1 | 12/2015 |
| WO | WO-2017022394 A1 * | 2/2017 ............. B60L 53/80 |

OTHER PUBLICATIONS

Apr. 23, 2020 International Preliminary Report on Patentability issued in International Patent Application No. PCT/JP2018/037523.
Jan. 6, 2022 Office Action issued in Chinese Patent Application No. 201880058586.3.

* cited by examiner

BATTERY MOUNTING UNIT, ELECTRIC DEVICE, AND POWER SUPPLY UNIT

TECHNICAL FIELD

The present teaching relates to a battery mounting unit which is configured to be attached to an apparatus that receives electric power from a battery device and to/from which the battery device is attachable and detachable, and also relates to an electric apparatus and a power supply unit including the battery mounting unit.

BACKGROUND ART

A known battery mounting unit is attached to an apparatus that receives electric power from a battery device, and the battery device is attachable and detachable to/from the battery mounting unit. As an apparatus including such a battery mounting unit, Patent Document 1, for example, discloses an electric vehicle including a battery device that is attachable and detachable to/from a battery mounting part. The battery mounting part of this electric vehicle includes connection terminals to be connected to connection terminals of the battery device.

In general, the connection terminals for use in a battery mounting part of an electric vehicle as described above has a projecting shape, and connection terminals of a battery device to be connected to the connection terminals have a shape to which the connection terminals of the battery mounting part are insertable. In the case where the connection terminals of the battery mounting part and the connection terminals of the battery device have the shapes described above, a large force as a sum of a force for separating the connection terminals from each other and a force for lifting the battery device is needed in order to detach the battery device from the battery mounting part.

On the other hand, in the electric vehicle, the battery device is caused to pivot about the battery mounting part so that connection between the connection terminals of the battery device and the connection terminals of the battery mounting part is thereby cancelled, and the battery device is detached from the battery mounting part.

Consequently, the battery device can be detached from the battery mounting part of the electric vehicle with a relatively small force.

CITATION LIST

Patent Document

Japanese Patent Application Publication No. 2017-73838

SUMMARY OF INVENTION

Technical Problem

Since the battery device of the electric vehicle disclosed in Patent Document 1 is pivotable about the battery mounting part, the battery device can be easily detached from the battery mounting part. However, the battery device cannot pivot about the battery mounting part in some cases depending on the shape of the battery device or the surrounding space of the battery device. In such cases, the battery device cannot be easily detached from the battery mounting part, as disclosed in Patent Document 1. That is, in the mounting structure of the battery device as disclosed in Patent Document 1, it is not easy to detach or attach battery devices having various shapes.

It is therefore an object of the present teaching to provide a configuration capable of easily attaching and detaching battery devices having various shapes, in a battery mounting unit to/from which a battery device is attachable and detachable.

Solution to Problem

A battery mounting unit according to one embodiment of the present teaching is a battery mounting unit which is configured to be attached to an apparatus that receives electric power from a battery device having an external terminal and to/from which the battery device is attachable and detachable. The battery mounting unit includes: a connection terminal configured to fit to the external terminal and having a shape along which the external terminal is slidable at least in one direction; and a lever rotatable about a fulcrum, the lever being located at a side at which the connection terminal is located when seen from the battery device in a state where the external terminal is fitted to the connection terminal. One of the external terminal or the connection terminal is configured to be elastically deformable to allow the external terminal and the connection terminal to fit to each other by sandwiching the other one of the external terminal or the connection terminal between the one of the external terminal or the connection terminal. The lever includes an arm including the fulcrum and a first action part, the first action part being located closer to the battery device than the fulcrum in the state where the external terminal of the battery device is fitted to the connection terminal and being configured to contact the battery device when the lever rotates about the fulcrum, and a gripper connected to a side of the arm opposite to the first action part with respect to the fulcrum. When the lever rotates about the fulcrum by a force applied to the gripper, the first action part applies a force to the battery device such that the battery device slides in a direction in which fitting between the external terminal and the connection terminal is canceled (first configuration).

With this configuration, by rotating the lever about the fulcrum, fitting between the external terminal of the battery device and the connection terminal can be easily canceled so that the battery device can be thereby separated from the battery mounting unit. Specifically, a force is applied to the gripper of the lever such that the lever rotates about the fulcrum. Accordingly, the first action part of the lever applies a force to the battery device such that the battery device slides in a direction in which fitting between the external terminal and the connection terminal is canceled. That is, by utilizing the "principle of leverage" by the lever, the external terminal can be caused to slide to cancel fitting of the external terminal to the connection terminal. In this manner, fitting between the external terminal and the connection terminal can be easily canceled. As a result, the battery device can be easily separated from the battery mounting unit.

In addition, the lever is located at the side at which the connection terminal is located when seen from the battery device in the state where the external terminal is fitted to the connection terminal. Thus, a force generated by rotation of the lever can be applied to a portion of the battery device close to a fitting portion between the external terminal and the connection terminal. As a result, fitting between the external terminal and the connection terminal can be canceled with a small force.

In the first configuration, the lever rotates about the fulcrum to be switched between a fixed state where the battery device is fixed to the apparatus with the external terminal fitted to the connection terminal and an unfixed state where fitting between the external terminal and the connection terminal is canceled (second configuration).

With this configuration, attachment and detachment of the battery device to/from the apparatus can be easily performed by rotation of the lever.

In the first or second configuration, the lever includes a first protrusion serving as the first action part, and the first action part is configured to apply a force to the battery device through a first load receiving surface of the battery device such that the battery device slides in a direction in which fitting between the external terminal and the connection terminal is canceled when the lever rotates about the fulcrum in a first direction by a force applied to the gripper (third configuration).

With this configuration, the battery device can be easily separated from the apparatus by rotation of the lever.

In any one of the first through third configurations, the lever includes a second protrusion serving as a second action part, and the second action part is configured to apply a force to the battery device through a second load receiving surface of the battery device such that the battery device slides in a direction in which the external terminal is fitted to the connection terminal when the lever rotates about the fulcrum in a second direction by a force applied to the gripper (fourth configuration).

With this configuration, the battery device can be easily mounted to the apparatus by rotation of the lever.

In the fourth configuration, the first direction in which the external terminal is slidable with respect to the connection terminal is a direction in which the battery device moves away from the apparatus. The first protrusion is disposed closer to the apparatus than the second protrusion in the lever (fifth configuration).

With this configuration, the first protrusion serving as the first action part enables the battery device to be more easily separated from the apparatus. Specifically, since the first protrusion is located closer to the apparatus than the second protrusion, rotation of the lever can cancel fitting between the external terminal of the battery device and the connection terminal while easily lifting the battery device from the apparatus.

In the first or second configuration, the first direction in which the external terminal is slidable with respect to the connection terminal is a direction in which the battery device moves away from the apparatus. The first action part is located between the battery device and the apparatus in the state where the external terminal of the battery device is fitted to the connection terminal. The lever is configured such that when the lever rotates about the fulcrum by a force applied to the gripper, the first action part applies a force to the battery device in a direction in which the battery device moves away from the apparatus (sixth configuration).

With this configuration, while the battery device is moved away from the apparatus, fitting between external terminal of the battery device and the connection terminal can be canceled. Consequently, the battery device can be easily detached from the apparatus.

In any one of the first, second, and sixth configurations, the arm includes a connection portion between the first action part and the gripper when seen in a direction orthogonal to a rotation plane formed by rotation of the lever. The fulcrum is located at the connection portion (seventh configuration).

With this configuration, rotation of the lever about the fulcrum enables the arm to be used as the "lever." Accordingly, a force applied to the gripper can be easily transferred to the battery device by the first action part. Consequently, fitting between the external terminal of the battery device and the connection terminal can be easily canceled so that the battery device can be thereby detached from the apparatus.

In any one of the first, second, sixth, and seventh configurations, the lever includes a pair of the arms. The pair of arms is connected to the gripper such that the first action parts of the pair of arms face each other with the battery device interposed therebetween in the state where the external terminal of the battery device is fitted to the connection terminal (eighth configuration).

With this configuration, the battery device can be moved to cancel fitting between the external terminal of the battery device and the connection terminal by the pair of arms of the lever. Consequently, fitting between the external terminal of the battery device and the connection terminal can be easily canceled.

In any one of the first, second, and sixth through eighth configurations, the battery mounting unit further includes a lock mechanism configured to lock the lever in the state where the external terminal of the battery device is fitted to the connection terminal (ninth configuration).

With this configuration, even upon application of vibrations to battery device, the state of fitting between the external terminal of the battery device and the connection terminal can be maintained. In addition, since the external terminal can be fitted to the connection terminal by locking the lever by the lock mechanism, fitting between the external terminal and the connection terminal can be further ensured.

In the ninth configuration, the lock mechanism includes a lock portion, and a biasing force application portion configured to apply a biasing force to the lock portion. The lock mechanism is configured to be in an unlocked state where the lever is unlocked by pushing the lock portion downward, and to be in a locked state where the lever is locked by pushing the lock portion upward by a biasing force of the biasing force application portion (tenth configuration).

With this configuration, the lock mechanism can switch the lever between a locked state and an unlocked state. Thus, it is possible to easily switch between fixing of the battery device to the apparatus and detachment of the battery device from the apparatus.

In the ninth or tenth configuration, the lock mechanism is disposed to enable locking of the gripper of the lever (eleventh configuration). This configuration further ensures locking of the lever by the lock mechanism. In addition, since the lock mechanism can be easily operated in applying a force to the gripper of the lever, the lever can be easily unlocked. Thus, operability of the lock mechanism can be enhanced.

In the eleventh configuration, the gripper includes an engagement portion engageable with the lock mechanism (twelfth configuration). With this configuration, the lever can be locked by the lock mechanism.

In any one of the ninth through twelfth configurations, the battery mounting unit further includes a connection terminal holder configured to hold the connection terminal. The lever is rotatably disposed on the connection terminal holder. The lock mechanism is disposed on the connection terminal holder to enable locking of the lever (thirteenth configuration).

With this configuration, the connection terminal, the lever, and the lock mechanism can be disposed in a small area. Thus, the configuration of the battery mounting unit can be made compact.

In the thirteenth configuration, the lever is disposed such that the gripper overlaps the connection terminal holder when seen in a direction in which the apparatus and the battery device are arranged in the state where the external terminal of the battery device is fitted to the connection terminal. The lock mechanism is disposed at a location overlapping the gripper of the lever when seen in the direction in which the apparatus and the battery device are arranged in the state where the external terminal of the battery device is fitted to the connection terminal (fourteenth configuration).

With this configuration, the lever and the lock mechanism can be disposed in a small area with respect to the connection terminal holder, and the lock mechanism can be easily operated in applying a force to the gripper of the lever. Thus, operability of the lever and the lock mechanism can be enhanced.

In any one of the first through fourteenth configurations, a fitting force between the connection terminal and the external terminal of the battery device is larger than a load of the battery device (fifteenth configuration).

In this configuration where a fitting force between the connection terminal and the external terminal of the battery device is large as described above, the configuration of the battery mounting unit as described above can easily cancel fitting between the connection terminal and the external terminal. That is, each of the first through fourteenth configurations is useful especially for a battery mounting unit showing a large fitting force between the connection terminal and the external terminal of the battery device as described above.

In any one of the first through fifteenth configurations, the connection terminal is configured to fit the external terminal disposed in the battery device whose width or length is larger than a height of the battery device (sixteenth configuration).

As described above, it is difficult to detach the battery device whose width or length is larger than the height from the battery mounting unit by pivoting in a conventional manner. In addition, in case that the battery device having the configuration described above is detached by pivoting in a conventional manner, the battery device moves in a wider range by the pivot, and thus, it is difficult to detach the battery device. On the other hand, each of the first through fifteenth configurations applied to the battery mounting unit eases cancellation of fitting between the external terminal of the battery device and the connection terminal. That is, the first through fifteenth configurations are effective especially for the battery mounting unit to which the battery device having the configuration described above is mounted.

In any one of the first through sixteenth configurations, the battery mounting unit further includes a retainer configured to retain the battery device at a side opposite to the connection terminal with respect to the battery device in the state where the external terminal of the battery device is fitted to the connection terminal (seventeenth configuration). This configuration further ensures fitting of the battery device to the apparatus.

An electric apparatus according to one embodiment of the present teaching is an electric apparatus configured to receive electric power from a battery device having an external terminal. This electric apparatus includes the battery mounting unit having any one of the first through seventeenth configurations (eighteenth configuration).

In the case of an electric apparatus, a relatively large current flows between external terminals of the battery device and connection terminals of the electric apparatus, and vibrations are easily applied to the battery device. Thus, it is necessary to fit the external terminals to the connection terminals more firmly. Accordingly, each of the first through seventeenth configurations applied to the battery mounting unit configured to be attached to the electric apparatus eases cancellation of fitting between the external terminal and the connection terminal.

A power supply unit according to one embodiment of the present teaching includes: a battery device; and the battery mounting unit according to any one of the first through seventeenth configurations, the battery mounting unit being configured such that the battery device is attachable and detachable to/from the battery mounting unit (nineteenth configuration).

In the nineteenth configuration, the battery device includes a secondary battery (twelfth configuration). In the case where the battery device includes the secondary battery, the battery device is frequently attached and detached to/from the apparatus. Thus, each of the first through seventeenth configurations applied to the battery mounting unit eases detachment of the battery device from the apparatus. Accordingly, the battery device can be easily attached and detached to/from the apparatus.

Advantages of Invention

A battery mounting unit according to one embodiment of the present teaching includes: a connection terminal configured to fit to an external terminal of a battery device and having a shape along which the external terminal is slidable at least in one direction, and a lever rotatable about a fulcrum and located at a side at which the connection terminal is located when seen from the battery device in the state where the external terminal is fitted to the connection terminal. One of the external terminal or the connection terminal is configured to be elastically deformable to allow the external terminal and the connection terminal to fit to each other by sandwiching the other one of the external terminal or the connection terminal between the one of the external terminal or the connection terminal. The battery mounting unit applies a force to the battery device by the lever configured to rotate about the fulcrum such that the battery device slides in a direction in which fitting between external terminal of the battery device and the connection terminal is canceled.

With the configuration described above, fitting between the external terminal of the battery device and the connection terminal is easily canceled so that the battery device can be easily separated from the battery mounting unit.

DESCRIPTION OF EMBODIMENTS

Figure 1:
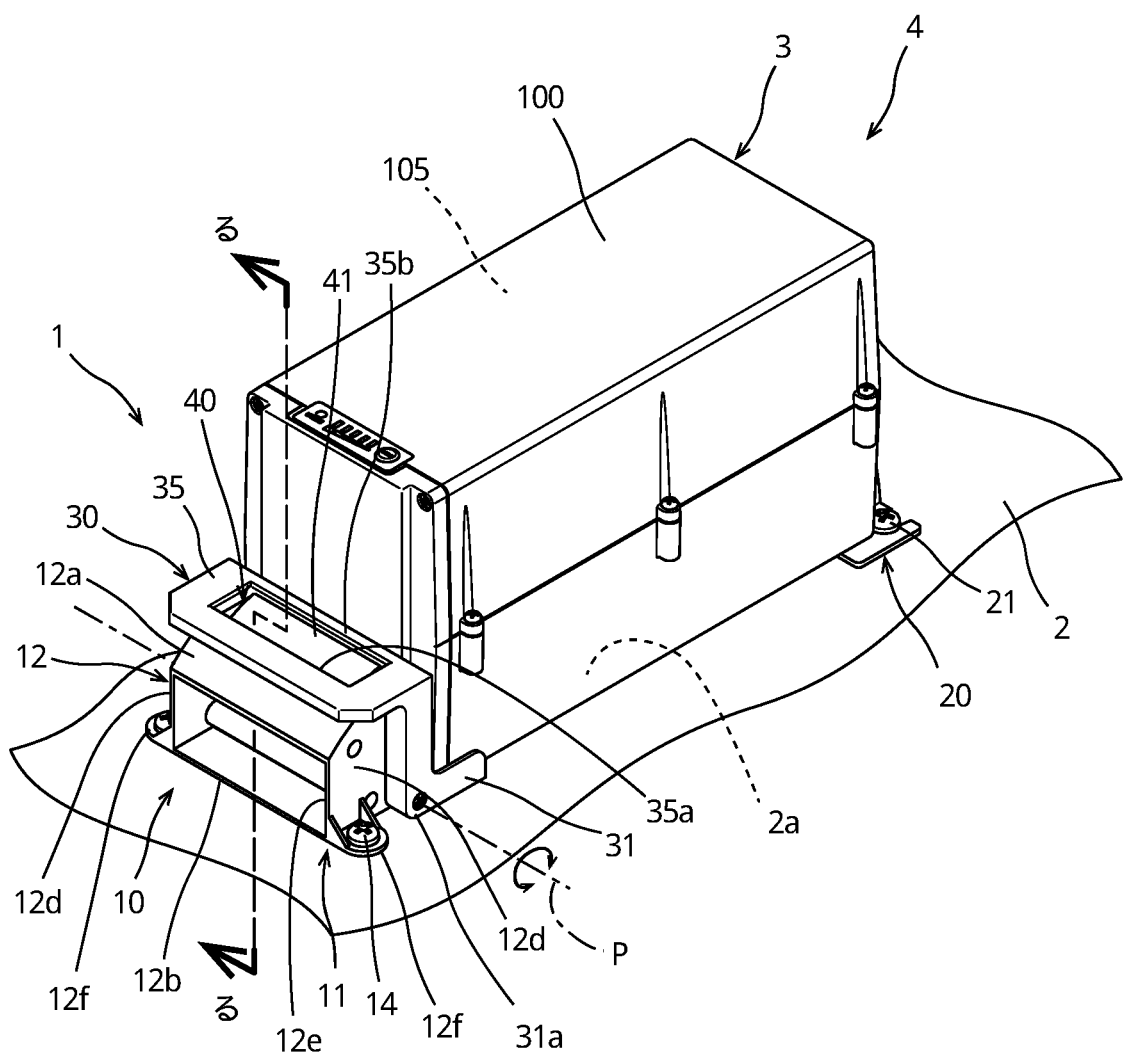
FIG. 1 is a perspective view illustrating a state where a battery device is attached to a battery mounting unit according to a first embodiment.

With reference to the drawings, embodiments of the present teaching will be described hereinafter. In the drawings, the same or corresponding parts are denoted by the same reference numerals, and the description thereof will not be repeated.

In the following description, with respect to an attachment surface 2a of an apparatus 2 to which a battery mounting unit 1 is attached, a direction perpendicular to the attachment surface 2a will be referred to as a top-bottom direction, and a direction along the attachment surface 2a will be referred to as a left-right direction. A direction in which the battery mounting unit 1 is attached to the attachment surface 2a will be referred to as an upward direction.

In the following description, expressions such as "fix," "connect," and "attach" (hereinafter collectively referred to as, for example, "fix") include not only a case where members are directly fixed, for example, but also include a case where the members are fixed, for example, with another member interposed therebetween. That is, in the following description, expressions such as "fix" include direct and indirect fix or the like between members.

First Embodiment (Overall Configuration)

Figure 2:
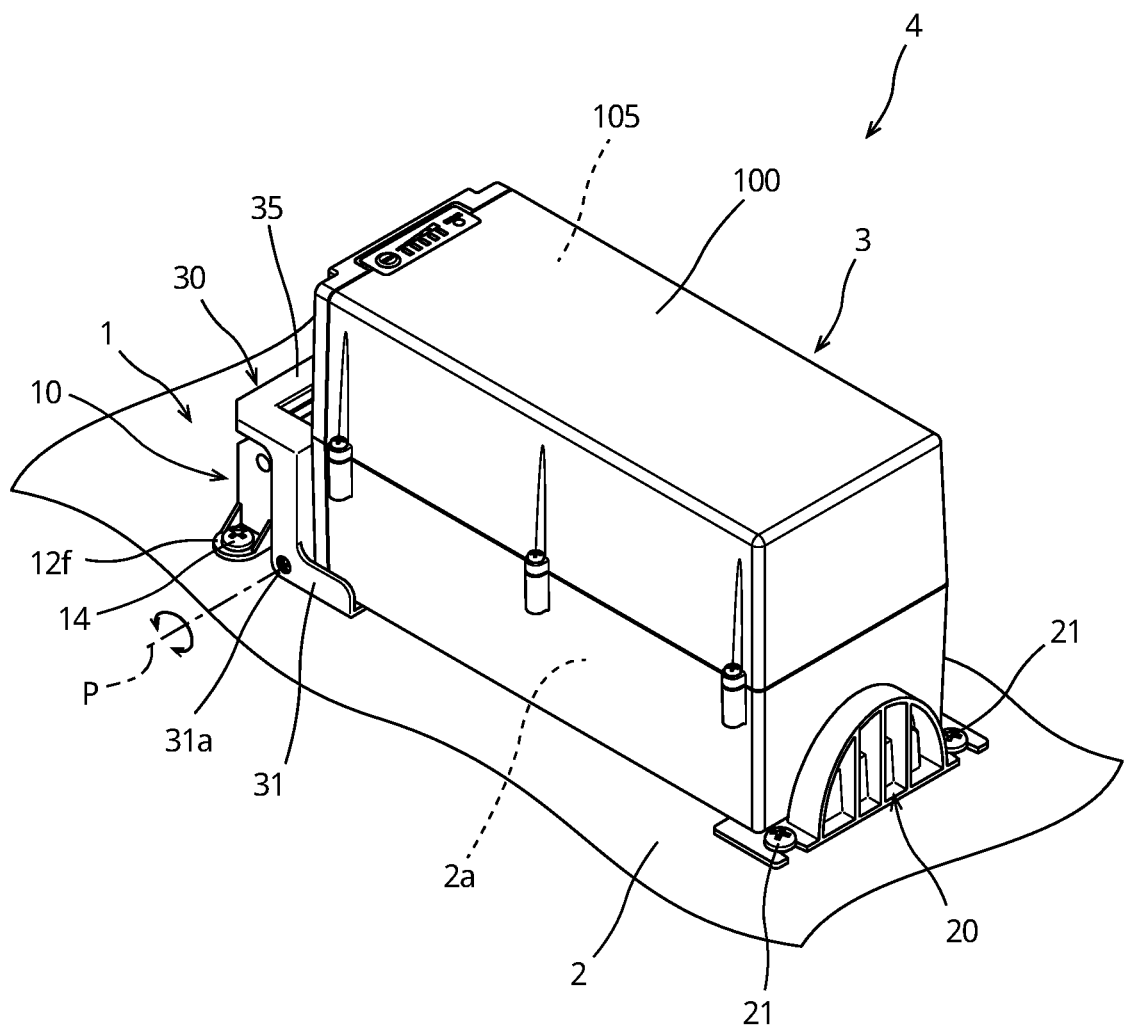
FIG. 2 is a perspective view illustrating the state where the battery device is attached to the battery mounting unit according to the first embodiment.

FIGS. 1 and 2 are perspective views each illustrating a schematic configuration of a battery mounting unit 1 and a battery device 3 according to a first embodiment of the present teaching. The battery mounting unit 1 is a device for mounting the battery device 3 to the apparatus 2. Specifically, the battery mounting unit 1 is attached to the apparatus 2. The battery device 3 is mounted to the battery mounting unit 1. The battery mounting unit 1 is electrically connected to the apparatus 2 via an unillustrated wire or the like such that the battery device 3 can supply electric power to the apparatus 2. By mounting the battery device 3 to the battery mounting unit 1, a power supply unit 4 is constructed.

The apparatus 2 is an electric apparatus that operates by driving of a motor and is an exemplified by an unmanned flying body, an electric tool, and a power-assisted bicycle. The motor of the apparatus 2 is driven by electric power supplied from the battery device 3. The apparatus 2 may be an apparatus other than an electric apparatus as long as the apparatus is driven by electric power supplied from the battery device 3.

Figure 3:
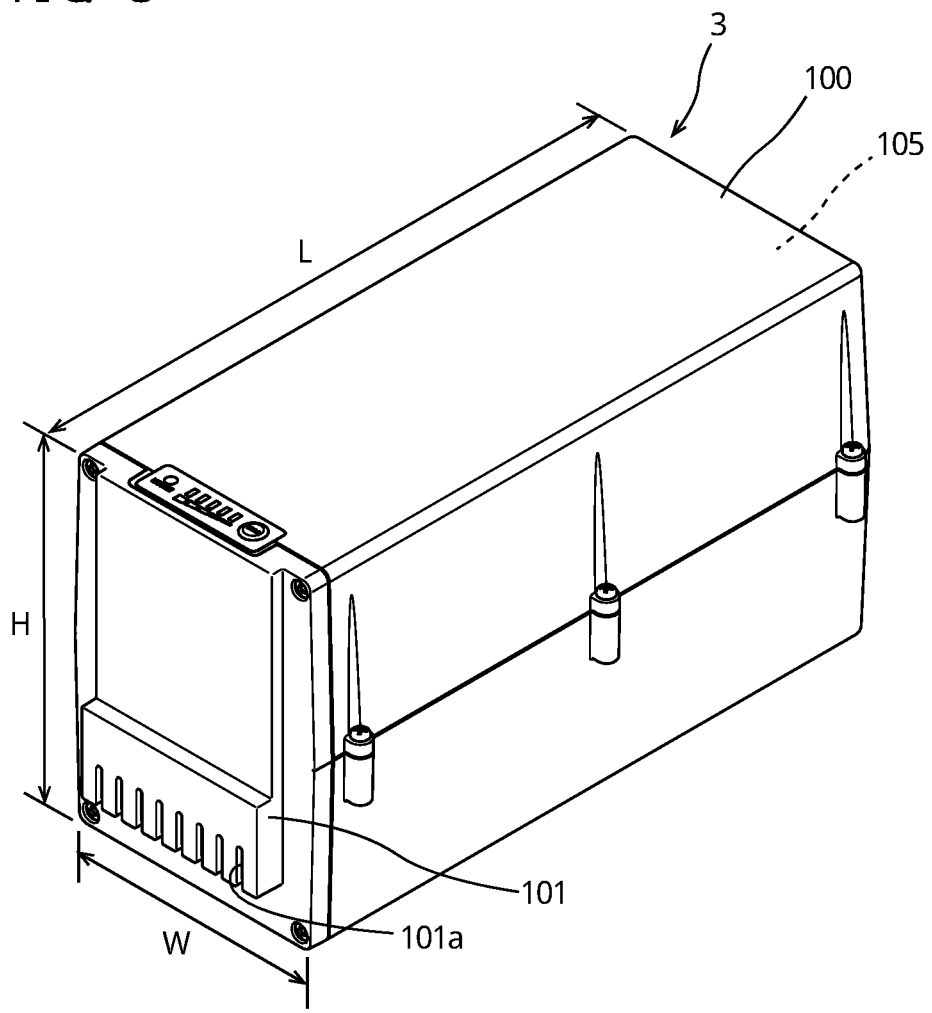
FIG. 3 is a perspective view illustrating a schematic configuration of the battery device.
Figure 4:
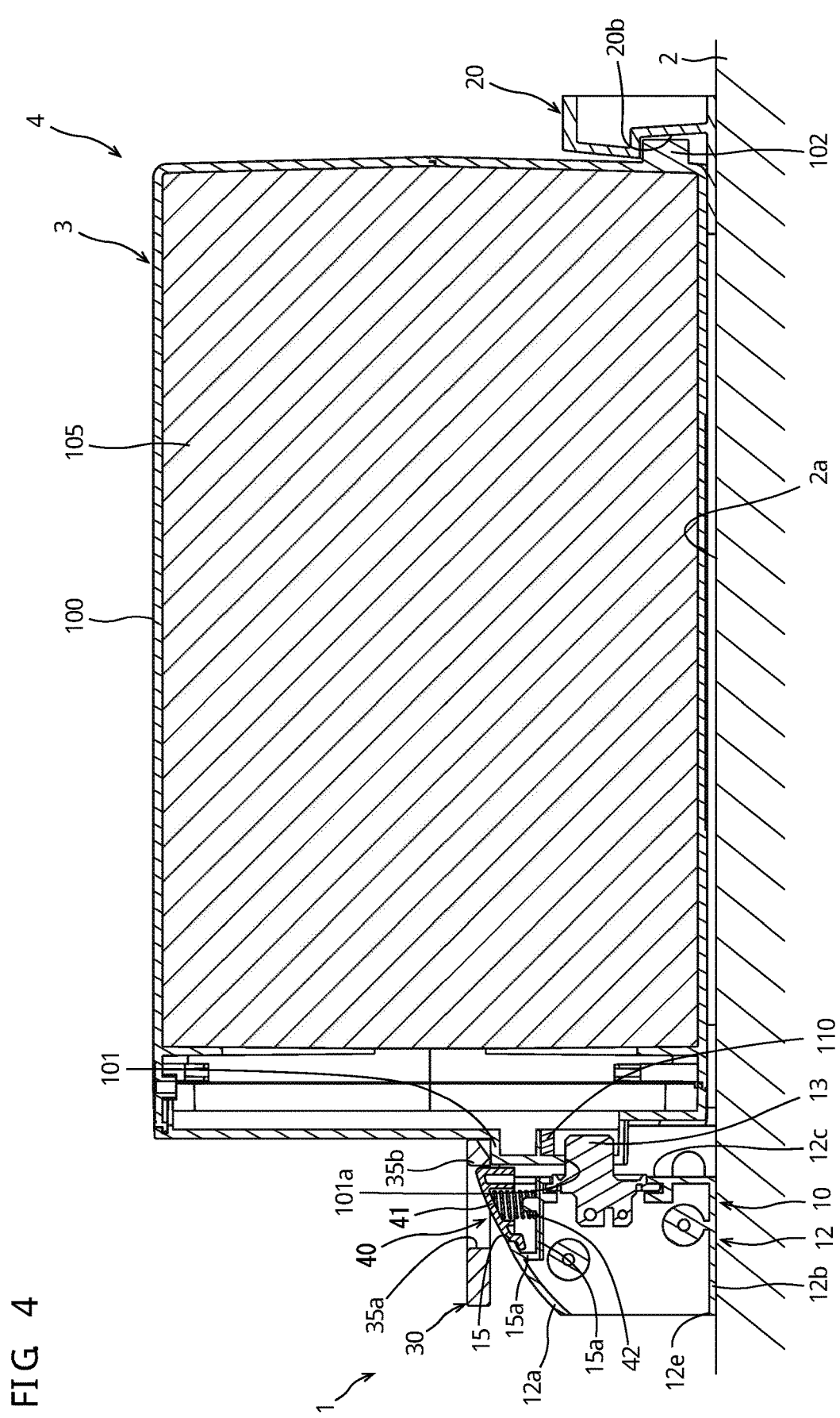
FIG. 4 is a cross-sectional view taken along line IV-IV in FIG. 1.

FIG. 3 is a perspective view illustrating a schematic configuration of the battery device 3. FIG. 4 is a cross-sectional view taken along line IV-IV in FIG. 1.

As illustrated in FIGS. 1 through 4, the battery device 3 has a rectangular parallelepiped shape, for example. The battery device 3 is attached to the battery mounting unit 1 such that the longitudinal direction of the battery device 3 is oriented along the attachment surface 2a of the apparatus 2. In the following description, in a state where the battery device 3 is mounted to the battery mounting unit 1, the top-bottom direction of the battery device 3 will be referred to as a height direction, and the left-right direction of the battery device 3 will be referred to as a width direction. In the state where the battery device 3 is mounted to the battery mounting unit 1, a dimension in the length direction L (length) or a dimension in the width direction W (width) of the battery device 3 is larger than a dimension in the height direction H (height). In the battery device 3 of this embodiment in the state of being mounted to the battery mounting unit 1, the length L is larger than the height H, and the height H is larger than the width W.

The battery device 3 includes a casing 100 having a rectangular parallelepiped shape, a lithium ion battery 105 housed in the casing 100, and external terminals 110. The lithium ion battery 105 is a rechargeable secondary battery and has a configuration similar to those of conventional batteries, and thus, will not be described in detail. Although not specifically shown, the battery device 3 also includes a control circuit for controlling charging and discharging of the lithium ion battery.

The casing 100 is a resin product having a rectangular parallelepiped shape, for example. As illustrated in FIG. 4, the casing 100 has a first projection 101 projecting in the longitudinal direction at one longitudinal end thereof, and has a second projection 102 projecting in the longitudinal direction at the other longitudinal end thereof. The first projection 101 and the second projection 102 are disposed below the center of the casing 100 in the height direction at the longitudinal ends of the casing 100. The casing 100 may be a part made of a material except for a resin, and/or may have a shape except for the rectangular parallelepiped shape.

Figure 8:
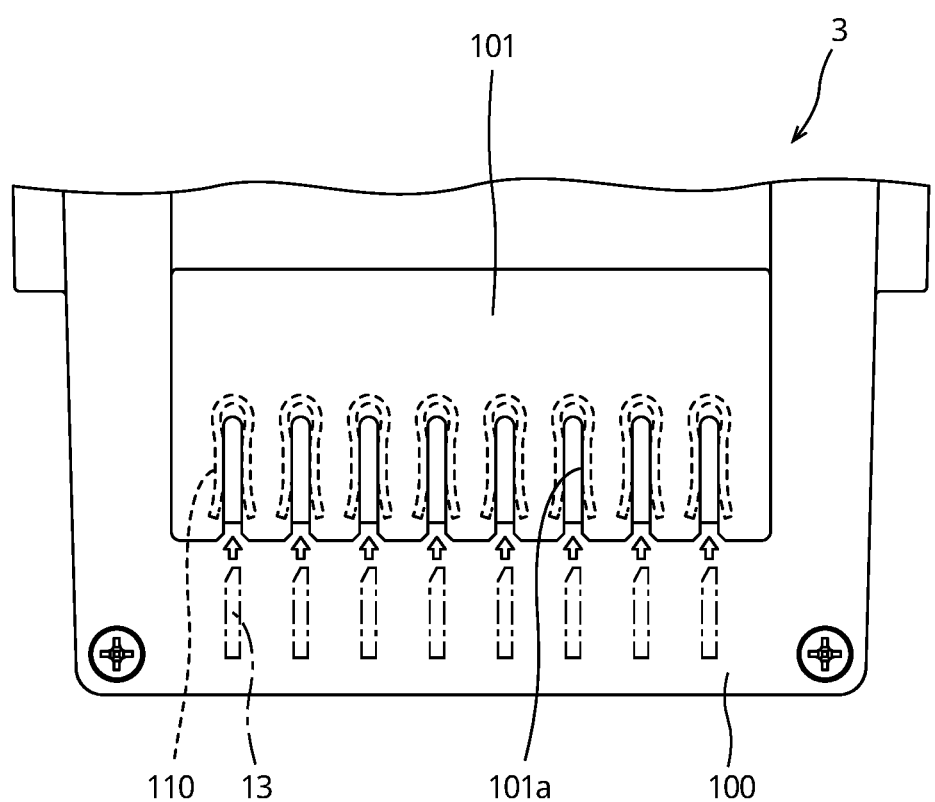
FIG. 8 is a view of a first projection of the battery device seen from one longitudinal end.

The first projection 101 is retained by a first retainer 10 of the battery mounting unit 1 described later. That is, the first projection 101 has a shape with which a lever 30 of the first retainer 10 described later can be engaged. As illustrated in FIGS. 3 and 8, the first projection 101 includes a plurality of slits 101*a* configured to house the external terminals 110. The plurality of slits 101*a* are provided in the first projection 101 to extend in the top-bottom direction and to be open at the bottom. FIG. 8 is a view of the first projection 101 of the battery device 3 seen from one longitudinal end.

The external terminals 110 are disposed in the slits 101*a* of the first projection 101, that is, at one longitudinal end of the casing 100. As illustrated in FIG. 8, each of the external terminals 110 is a part made of a U-shaped conductive material, and is disposed in a corresponding one of the slits 101*a* of the first projection 101 in the casing 100 to be open downward. The external terminals 110 are configured to be elastically deformable to produce an elastic restoring force by enlarging the openings of the external terminals 110.

Although not specifically shown, the external terminals 110 are electrically connected to the lithium ion battery 105 in the casing 100 through wires or the like.

(Battery Mounting Unit)

As illustrated in FIGS. 1 and 2, the battery mounting unit 1 includes the first retainer 10 and a second retainer 20. Each of the first retainer 10 and the second retainer 20 is fixed to the apparatus 2 with the battery device 3 interposed therebetween. That is, the first retainer 10 is located at one longitudinal end of the battery device 3, and the second retainer 20 is located at the other longitudinal end of the battery device 3. Both of the longitudinal ends of the battery device 3 in the state of being mounted to the battery mounting unit 1 are retained by the first retainer 10 and the second retainer 20. In this manner, the battery device 3 is fixed to the apparatus 2 with the battery mounting unit 1 interposed therebetween.

Figure 5:
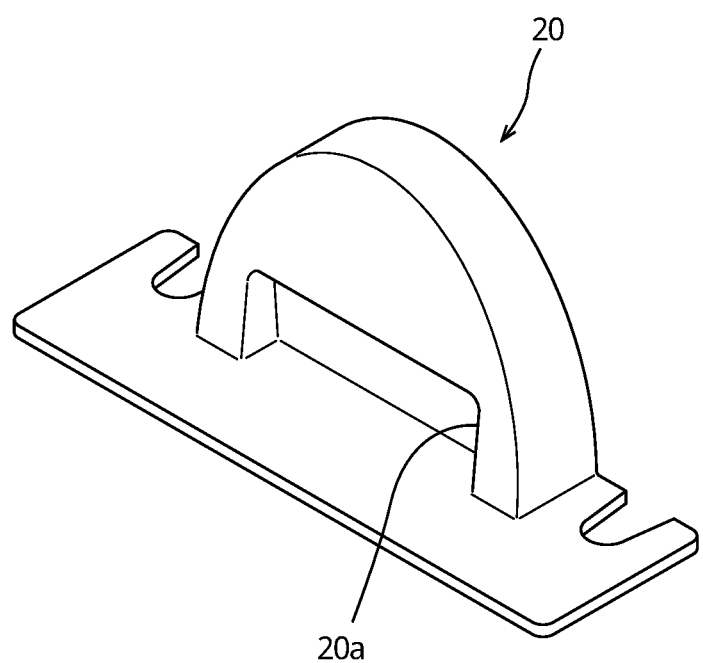
FIG. 5 is a perspective view illustrating a schematic configuration of a second retainer of the battery mounting unit.
Figure 6:
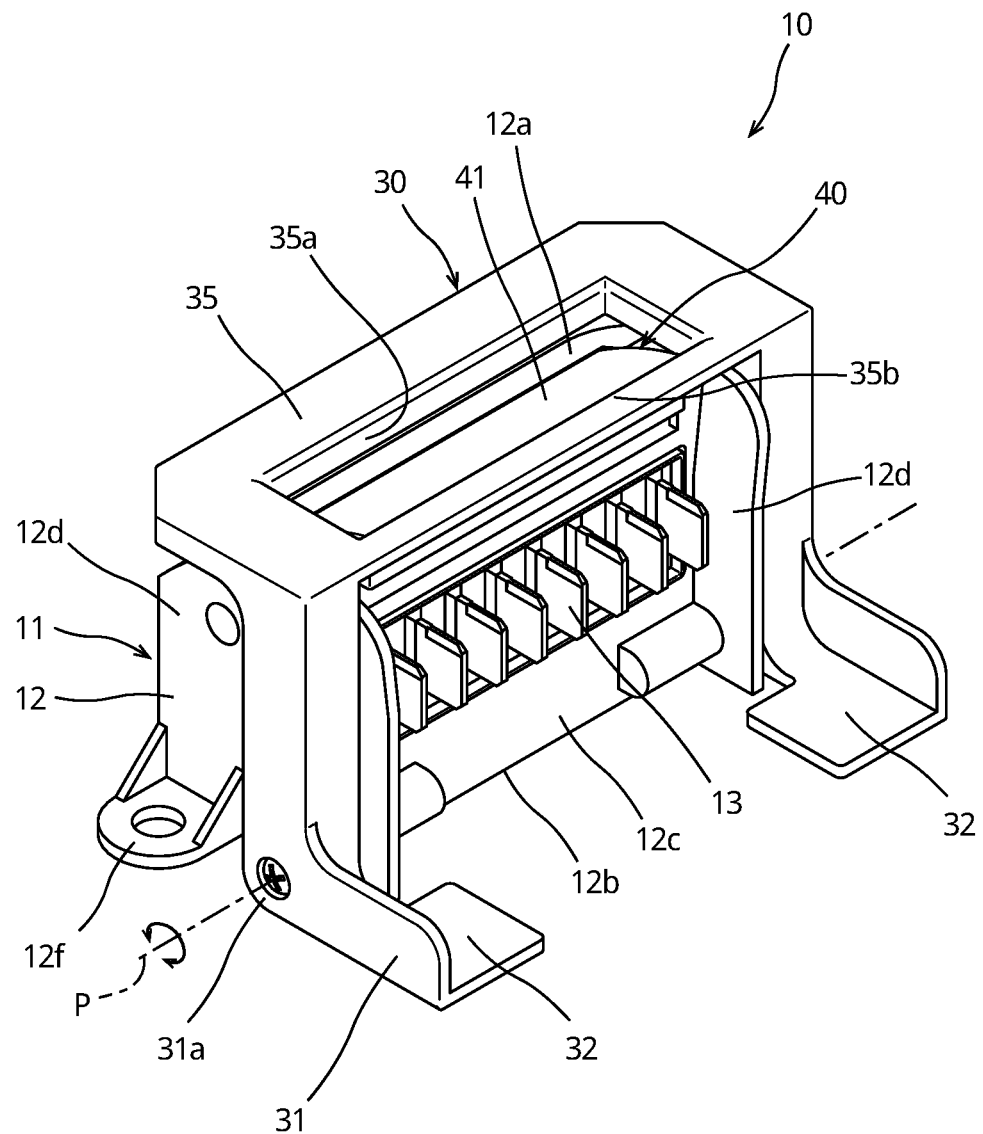
FIG. 6 is a perspective view illustrating a schematic configuration of a first retainer of the battery mounting unit.

FIG. 5 is a perspective view illustrating a schematic configuration of the second retainer 20. FIG. 6 is a perspective view illustrating a schematic configuration of the first retainer 10.

As illustrated in FIG. 5, the second retainer 20 has a recess 20*a* in which the second projection 102 of the casing 100 of the battery device 3 is inserted. The second projection 102 of the casing 100 of the battery device 3 is positioned in the recess 20*a* of the second retainer 20 so that the other longitudinal end of the casing 100 of the battery device 3 can be thereby retained by the second retainer 20. The second retainer 20 is fixed to the apparatus 2 with bolts 21.

As illustrated in FIGS. 1 and 4, the first retainer 10 retains one longitudinal end of the casing 100 of the battery device 3. As illustrated in FIG. 6, the first retainer 10 includes a connection terminal holder 11, the lever 30, and a lock mechanism 40. The connection terminal holder 11 is fixed to the apparatus 2. The connection terminal holder 11 includes, therein, connection terminals 13 that are fitted to the external terminals of the battery device 3. The lever 30 and the lock mechanism 40 are disposed in the connection terminal holder 11.

The connection terminal holder 11 includes a holder body 12 and the connection terminals 13.

The holder body 12 is a metal part having a substantially rectangular parallelepiped shape, for example. As illustrated in FIGS. 1 and 6, the holder body 12 includes a holder upper portion 12*a*, a holder bottom portion 12*b*, a holder side portion 12*c* and a pair of holder end portions 12*d*. The holder side portion 12*c* is located at a side of the holder body 12 facing the battery device 3 in a state where the battery device 3 is mounted to the battery mounting unit 1.

The holder upper portion 12*a* is located at the top of the holder body 12. As illustrated in FIGS. 1 and 4, the holder upper portion 12*a* is tilted downward to a direction opposite to the holder side portion 12*c* so as not to interfere with a gripper 35 of the lever 30 when the lever 30 rotates as described later. As illustrated in FIG. 4, the holder upper portion 12*a* has a housing recess 15 capable of housing the lock mechanism 40. The housing recess 15 has a rectangular shape when seen from above. The housing recess 15 includes a rectangular bottom portion 15*a* and a side portion 15*b* surrounding the bottom portion 15*a*.

The holder bottom portion 12*b* is located at the bottom of the holder body 12. The holder side portion 12*c* is located at one lateral end of the holder body 12, and extends in the longitudinal direction of the holder body 12. As illustrated in FIGS. 1 and 6, the holder end portions 12*d* are individually located at both longitudinal ends of the holder body 12.

As illustrated in FIGS. 1 and 4, the holder body 12 has an opening 12*e* at a side opposite to the holder side portion 12*c* in the lateral direction. The holder body 12 may not include the opening 12*e*.

In this embodiment, the holder body 12 also includes fixing portions 12*f*. The holder body 12 is fixed to the apparatus 2 with bolts 14 (see FIGS. 1 and 2) inserted in the fixing portions 12*f*.

As illustrated in FIGS. 4 and 6, the plurality of connection terminals 13 are disposed on the holder side portion 12*c* of the holder body 12. The connection terminals 13 are plate-shaped conductive metal parts each having a substantially rectangular shape in plan view.

The plurality of connection terminals 13 penetrate the holder side portion 12*c* in the thickness direction (lateral direction of the holder body 12), and are arranged side by side in the longitudinal direction of the holder body 12 such that the thickness direction of the connection terminals 13 coincides with the longitudinal direction of the holder body 12. That is, the plurality of connection terminals 13 are arranged in parallel at predetermined intervals in the thickness direction when viewed from above. The connection terminals 13 are electrically connected to the apparatus 2 by unillustrated wires.

Each of the connection terminals 13 is sandwiched in a corresponding one of the U-shaped external terminals 110 of the battery device 3 in the thickness direction in the state where the battery device 3 is mounted to the battery mounting unit 1. As described above, each of the external terminals 110 of the battery device 3 has a U shape, and is configured to be elastically deformable to produce an elastic restoring force by opening at the opening side (see FIG. 8). Thus, as illustrated in FIG. 8, the connection terminals 13 are inserted into the openings of the external terminals 110 of the battery device 3 in the state where the battery device 3 is mounted to the battery mounting unit 1 so that the connection terminals 13 are thereby fitted to the external terminals 110. A fitting force between the connection terminals 13 of the battery mounting unit 1 and the external terminals 110 of the battery device 3 is larger than a load of the battery device 3. The fitting force is, for example, about 0.04 kN, and a load of the battery device 3 is, for example, about 0.02 kN. In this embodiment, the load of the battery device 3 corresponds to a force with which the self-weight of the battery device 3 is exerted on action parts 32 of the lever 30 described later when the battery device 3 is supported by the action parts 32.

As described above, the plurality of connection terminals 13 are arranged in parallel with predetermined intervals in the thickness direction when viewed from above. Thus, the external terminals 110 of the battery device 3 to be fitted to the connection terminals 13 are slidable in the top-bottom direction relative to the connection terminals 13.

Figure 7:
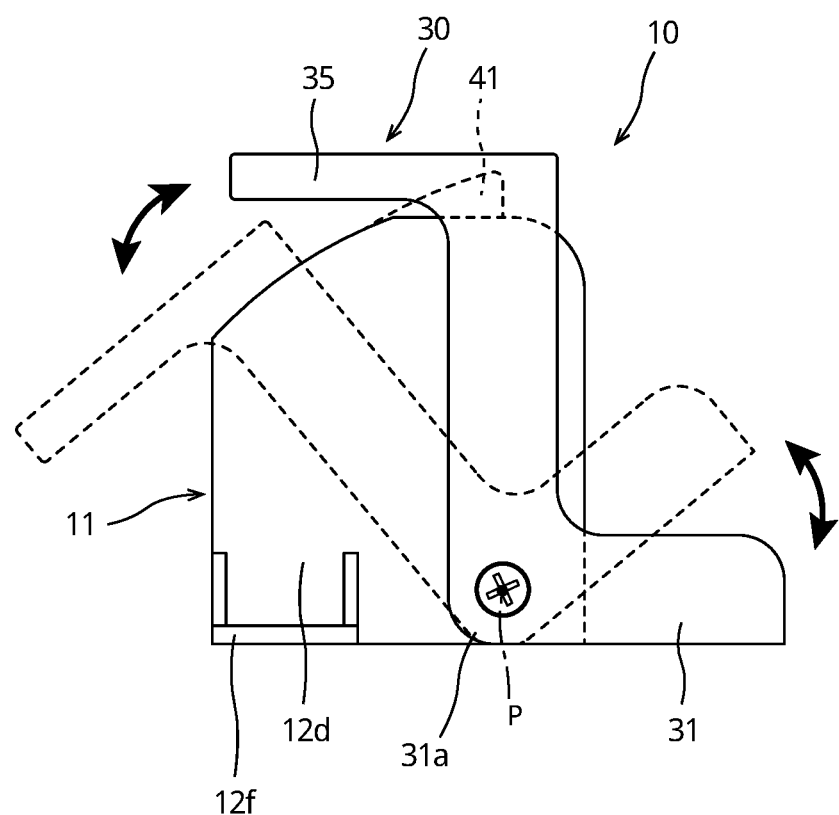
FIG. 7 is a side view illustrating a state where a lever rotates.

The lever 30 is rotatably connected to the holder body 12 (see FIG. 7). That is, as illustrated in FIGS. 1, 2, and 4, the lever 30 is located at the side at which the connection terminals 13 of the battery mounting unit 1 are located when seen from the battery device 3, in a state where the external terminals 110 of the battery device 3 are fitted to the connection terminals 13 of the battery mounting unit 1. As illustrated in FIG. 7, the lever 30 rotates about a fulcrum P connected to the holder body 12 so that the battery device 3 can be thereby switched between a fixed state where the battery device 3 is fixed to the battery mounting unit 1 (the state illustrated in FIG. 1 and indicated by the solid line in FIG. 7) to an unfixed state where fixing between the battery device 3 and the battery mounting unit 1 is canceled (the state illustrated in FIG. 10 and indicated by the broken line in FIG. 7). As will be described later, the unfixed state is a state where fitting between the connection terminals 13 of the battery mounting unit 1 and the external terminals 110 of the battery device 3 is canceled. FIG. 7 is a view illustrating the state where the lever 30 rotates when seen sideways.

As illustrated in FIGS. 1 and 4, the lever 30 is disposed such that the gripper 35 described later overlaps the connection terminal holder 11 when seen from the arrangement direction of the apparatus 2 and the battery device 3 (i.e., the top-bottom direction in this embodiment) in the state where the external terminals 110 of the battery device 3 are fitted to the connection terminals 13 of the battery mounting unit 1.

As illustrated in FIG. 6, the lever 30 includes a pair of arms 31 and the gripper 35. An end (first end) of one of the pair of arms 31 is integrally connected to the gripper 35. That is, the pair of arms 31 is integrated with the gripper 35. Although the lever 30 is a metal part in this embodiment, the present teaching is not limited to this example, and the lever 30 may be made of another material.

Each of the pair of arms 31 has a bent portion 31a (connection portion) and has an L shape as a whole. Each of the pair of arms 31 is rotatably supported by a lower portion of the holder body 12 at the bent portion 31a thereof. That is, the fulcrum P of the lever 30 is located at the bent portion 31a.

Each of the pair of arms 31 has the action part 32 (first action part) at the other end thereof (second end). When the lever 30 rotates and the battery device 3 is detached from the battery mounting unit 1, the action parts 32 are brought into contact with the battery device 3 and cause the battery device 3 to be separated from the battery mounting unit 1.

Each of the action parts 32 has a flat plate shape extending from a corresponding one of the arms 31 in the longitudinal direction of the holder body 12 and is integrally formed with the arm 31. The action parts 32 are located between the battery device 3 and the attachment surface 2a of the apparatus 2 in the state where the battery device 3 is mounted to the battery mounting unit 1.

The gripper 35 is connected to the second end of each of the pair of arms 31 opposite to the action parts 32 with the bent portion 31a interposed therebetween. That is, in each of the pair of arms 31, the bent portion 31a is located between the action part 32 and the gripper 35 when seen in a direction orthogonal to a rotation plane formed by rotation of the lever 30. The rotation plane is a plane drawn by the left and right ends of the arms 31 with rotation of the lever 30. The pair of arms 31 is connected to the gripper 35 such that the action parts 32 are opposed to each other with the battery device 3 interposed therebetween in the state where the external terminals 110 of the battery device 3 are fitted to the connection terminals 13 of the battery mounting unit 1.

When seen in the direction orthogonal to the rotation plane, the gripper 35 extends from ends of the pair of arms 31 in a direction opposite to the bent direction of the pair of arms 31 and orthogonal to the ends of the pair of arms 31. Accordingly, the lever 30 is bent in a crank shape.

The gripper 35 is a flat plate-shaped member, and has a rectangular opening 35a penetrating a center portion of the gripper 35 in the thickness direction when seen from above. While the lever 30 is in the fixed state, the gripper 35 is located above the holder upper portion 12a of the connection terminal holder 11. The opening 35a of the gripper 35 has a shape with which a lock portion 41 of the lock mechanism 40 disposed on the holder upper portion 12a of the connection terminal holder 11, which will be described later, can be engaged. That is, a peripheral portion 35b of the opening 35a of the gripper 35 is an engagement portion with which the lock portion 41 described later can be engaged.

The lock mechanism 40 is a mechanism for locking the lever 30 in the fixed state. The lock mechanism 40 is disposed on the holder upper portion 12a of the holder body 12 of the connection terminal holder 11. As illustrated in FIGS. 1 and 4, in the state where the external terminals 110 of the battery device 3 are fitted to the connection terminals 13 of the battery mounting unit 1, the lock mechanism 40 is located at a location overlapping the gripper 35 of the lever 30 when seen in the arrangement direction of the apparatus 2 and the battery device 3 (the top-bottom direction in this embodiment). The lock mechanism 40 is engaged with the peripheral portion 35b of the opening 35a in the gripper 35 of the lever 30 to thereby lock the lever 30 with respect to the connection terminal holder 11.

The lock mechanism 40 includes the lock portion 41 and a biasing force application portion 42.

The lock portion 41 is a rectangular-shaped plate member when seen from above, and in a manner similar to the holder upper portion 12a of the holder body 12 of the connection terminal holder 11, the lock portion 41 is tilted downward toward the direction opposite to the holder side portion 12c. The lock portion 41 is housed in the housing recess 15 disposed on the holder upper portion 12a of the connection terminal holder 11.

The biasing force application portion 42 is a helical compression coil spring extending in the axial direction, for example. The biasing force application portion 42 is disposed between the bottom portion 15a of the housing recess 15 of the connection terminal holder 11 and the lock portion 41 housed in the housing recess 15, and elastically supports the lock portion 41 with respect to the bottom portion 15a of the housing recess 15. The biasing force application portion 42 biases the lock portion 41 in the direction away from the bottom portion 15a of the housing recess 15.

The lock portion 41 is biased by the biasing force application portion 42 such that the upper surface of the lock portion 41 is located above the outer surface of the holder upper portion 12a of the holder body 12 and is engageable with the peripheral portion 35b of the opening 35a of the gripper 35 in the lever 30.

With the configuration described above, the lock portion 41 is caused to project above the outer surface of the holder upper portion 12a of the holder body 12 by the biasing force application portion 42 to be engaged with the peripheral portion 35b of the opening 35a of the gripper 35 in the lever 30. Accordingly, the lever 30 can be locked.

On the other hand, the lock portion 41 is pushed down against an elastic restoring force of the biasing force application portion 42 to be thereby located below the outer surface of the holder upper portion 12a of the holder body 12. In this manner, engagement of the lock portion 41 with the peripheral portion 35b of the opening 35a of the gripper 35 in the lever 30 is canceled. Accordingly, the lever 30 is unlocked.

As described above, the battery mounting unit 1 includes the lock mechanism 40 that locks the lever 30 in the state where the external terminals 110 of the battery device 3 are fitted to the connection terminals 13 of the battery mounting unit 1. Thus, even under application of vibrations to the battery device 3, fitting of the external terminals 110 of the battery device 3 to the connection terminals 13 of the battery mounting unit 1 can be maintained. In addition, since the lever 30 is locked by the lock mechanism 40 with the lever 30 engaged with the first projection 101 of the casing 100 of the battery device 3, fitting between the external terminals 110 of the battery device 3 and the connection terminals 13 of the battery mounting unit 1 can be further ensured.

In the configuration described above, the lock mechanism 40 includes the lock portion 41 and the biasing force application portion 42 for applying a biasing force to the lock portion 41, and is configured to be in an unlocked state where the lever 30 is unlocked by pushing the lock portion 41 downward and to be in a locked state where the lever 30 is locked by pushing the lock portion 41 upward by an biasing force of the biasing force application portion 42.

In the manner described above, the lock mechanism 40 can lock or unlock the lever 30 with respect to the connection terminal holder 11. Thus, it is possible to easily switch between fixing of the battery device 3 to the apparatus 2 and unfixing of the battery device 3 from the apparatus 2.

In the configuration described above, the lock mechanism 40 is configured to lock the gripper 35 of the lever 30. This further ensures locking of the lever 30 by the lock mechanism 40. In addition, since the lock mechanism 40 can be easily operated in applying a force to the gripper 35 of the lever 30, the lever 30 can be easily unlocked. Thus, operability of the lock mechanism 40 can be enhanced.

In the configuration described above, the gripper 35 of the lever 30 includes the peripheral portion 35b of the opening 35a as an engagement portion engageable with the lock mechanism 40. Accordingly, the lever 30 can be locked by the lock mechanism 40.

In the configuration described above, the battery mounting unit 1 also includes the connection terminal holder 11 for holding the connection terminals 13. The lever 30 is rotatably disposed in the connection terminal holder 11, and the lock mechanism 40 is disposed in the connection terminal holder 11 and enables locking of the lever 30.

Accordingly, the connection terminals 13, the lever 30, and the lock mechanism 40 can be disposed in a small area. Thus, the configuration of the battery mounting unit 1 can be made compact.

In the configuration described above, the lever 30 is disposed such that the gripper 35 overlaps the connection terminal holder 11 when seen in the arrangement direction of the apparatus 2 and the battery device 3 in the state where the external terminals 110 of the battery device 3 are fitted to the connection terminals 13 of the battery mounting unit 1. The lock mechanism 40 is disposed at a location overlapping the gripper 35 of the lever 30 when seen in the arrangement direction of the apparatus 2 and the battery device 3 in the state where the external terminals 110 of the battery device 3 are fitted to the connection terminals 13 of the battery mounting unit 1.

Accordingly, the lever 30 and the lock mechanism 40 can be disposed in a small area with respect to the connection terminal holder 11, and the lock mechanism 40 can be easily operated in applying a force to the gripper 35 of the lever 30. Accordingly, operability of the lever 30 and the lock mechanism 40 can be enhanced.

(Operations of Attachment and Detachment of Battery Device)

Figure 9:
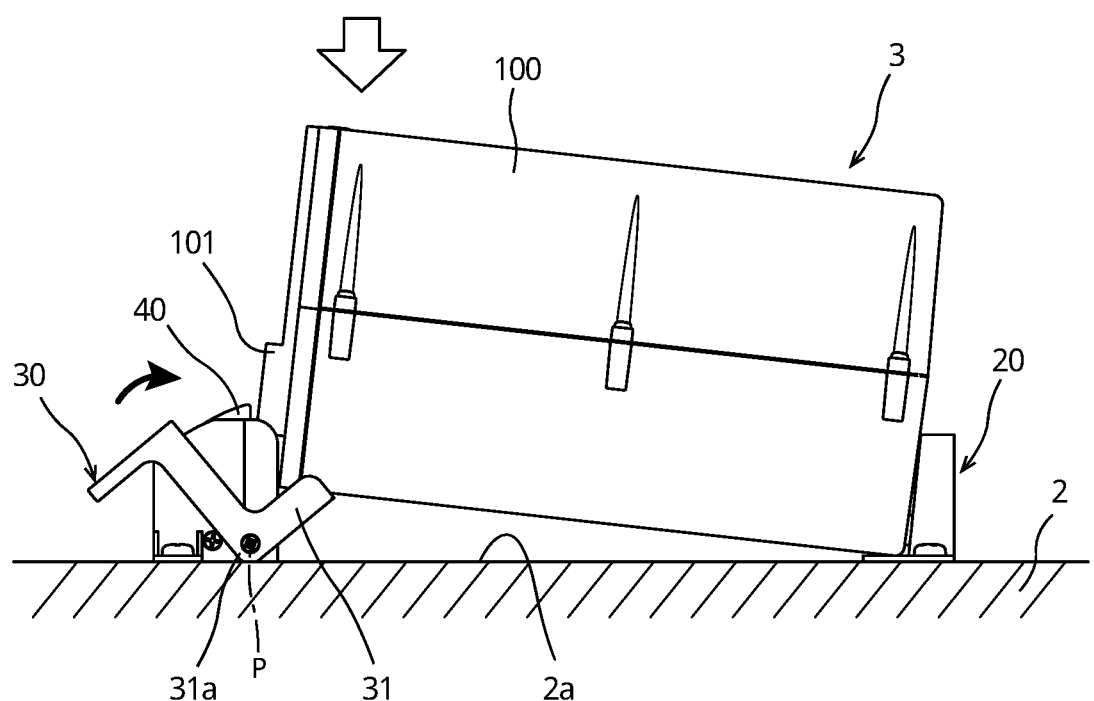
FIG. 9 is a side view illustrating mounting of the battery device to the battery mounting unit.
Figure 10:
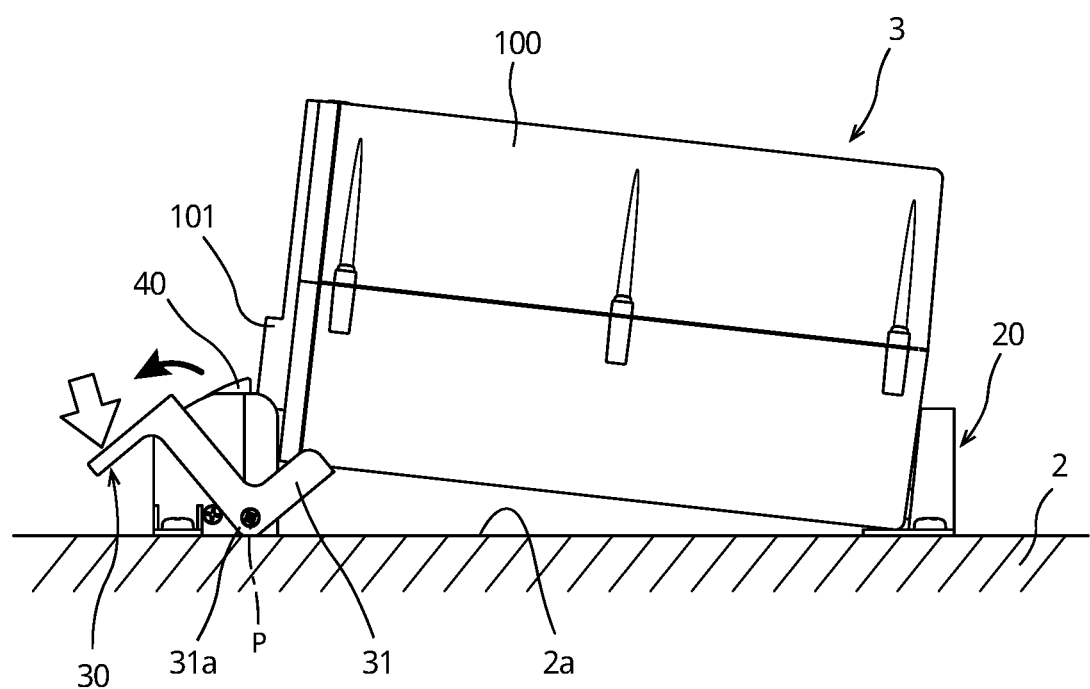
FIG. 10 is a side view illustrating detachment of the battery device from the battery mounting unit.
Figure 11:
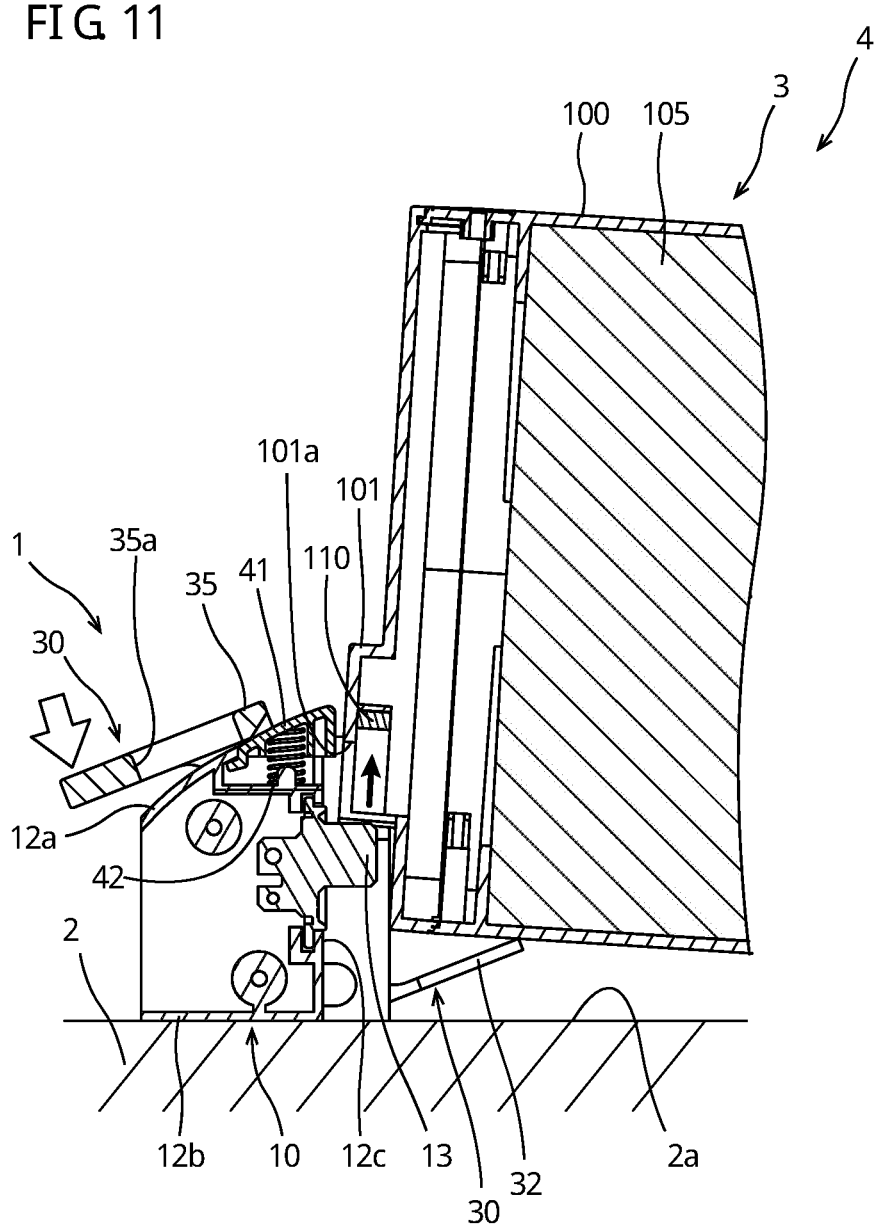
FIG. 11 is an enlarged partial view illustrating detachment of external terminals of the battery device from connection terminals of the battery mounting unit.

Next, operations of attaching and detaching the battery device 3 to/from the battery mounting unit 1 having the configuration described above will be described with reference to FIGS. 9 through 11. FIG. 9 is a side view illustrating attachment of the battery device 3 to the battery mounting unit 1. FIG. 10 is a side view illustrating detachment of the battery device 3 from the battery mounting unit 1. FIG. 11 is an enlarged partial cross-sectional view illustrating fitting between the external terminals 110 and the connection terminals 13 in attaching/detaching the battery device 3 to/from the battery mounting unit 1.

As illustrated in FIG. 9, in mounting the battery device 3 to the battery mounting unit 1, the second projection 102 of the casing 100 of the battery device 3 is first inserted in the recess 20a of the second retainer 20 of the battery mounting unit 1.

Thereafter, while the first projection 101 of the casing 100 of the battery device 3 is pressed against the action parts 32 of the lever 30, the external terminals 110 of the battery device 3 are fitted to the connection terminals 13 disposed in the connection terminal holder 11 of the battery mounting unit 1. At this time, the lever 30 rotates about the fulcrum P located at the bent portion 31a of the arms 31 such that gripper 35 is caused to rise.

The lock portion 41 of the lock mechanism 40 disposed on the holder upper portion 12a of the connection terminal holder 11 is pushed downward by the gripper 35 of the lever 30 that rotates as described above, and thus, is housed in the housing recess 15 of the connection terminal holder 11 while compressing the biasing force application portion 42 in the axial direction.

In the state where the external terminals 110 of the battery device 3 are fitted to the connection terminals 13 of the battery mounting unit 1 (the state illustrated in FIG. 4), the lever 30 is engaged with the first projection 101 of the casing 100 of the battery device 3 as illustrated in FIGS. 1 and 4. In this state, the lock portion 41 of the lock mechanism 40 is not subjected to the pressing force by the gripper 35 of the lever 30 anymore. Thus, the lock portion 41 is caused to project above the outer surface of the holder upper portion 12a of the connection terminal holder 11 by an elastic restoring force of the biasing force application portion 42. Accordingly, the lock portion 41 of the lock mechanism 40 is engaged with the peripheral portion 35b of the opening 35a of the gripper 35 in the lever 30. Consequently, the lever 30 is locked in the connection terminal holder 11 by the lock mechanism 40 so that the lever 30 thereby comes to be in the fixed state where the lever 30 is engaged with the first projection 101 of the casing 100 of the battery device 3.

Accordingly, with the battery device 3 being mounted to the battery mounting unit 1, the battery device 3 can be retained by the first retainer 10 and the second retainer 20 of the battery mounting unit 1. In the manner described above, in the state where the battery device 3 is mounted to the battery mounting unit 1, electric power is supplied from the battery device 3 to the apparatus 2 through the external terminals 110 of the battery device 3 and the connection terminals 13 of the battery mounting unit 1.

Next, in detaching the battery device 3 from the battery mounting unit 1, while the lock portion 41 of the lock mechanism 40 is pressed to a position below the outer surface of the holder upper portion 12a of the connection terminal holder 11, a force is applied to the gripper 35 of the lever 30 in a direction away from the battery device 3, as illustrated in FIG. 10.

Accordingly, the locking of the lever 30 by the lock mechanism 40 is canceled, and thus, the lever 30 rotates about the fulcrum P in a direction in which the arms 31 fall (indicated by the solid arrow in the drawing). As illustrated in FIG. 11, such rotation of the lever 30 causes the action parts 32 of the lever 30 to move in a direction in which one of the longitudinal ends of the battery device 3 moves away from the apparatus 2 (indicated by the bold arrow) such that fitting between the external terminals 110 of the battery device 3 and the connection terminals 13 of the battery mounting unit 1 is canceled.

At this time, with the "principle of leverage" by the lever 30, fitting between the external terminals 110 of the battery device 3 and the connection terminals 13 of the battery mounting unit 1 can be easily canceled, and one of the longitudinal ends of the battery device 3 can be easily moved away from the apparatus 2.

In the configuration of this embodiment, the connection terminals 13 disposed in the connection terminal holder 11 of the battery mounting unit 1 have the shape along which the external terminals 110 are slidable in attaching/detaching the battery device 3 to/from the battery mounting unit 1. The lever 30 rotatable about the fulcrum P is disposed in the connection terminal holder 11. The lever 30 includes the action parts 32 located closer to the battery device 3 than the fulcrum P, and also includes the gripper 35 located at a side opposite to the action parts 32 with respect to the fulcrum P.

Accordingly, by rotating the lever 30 about the fulcrum P, fitting between the external terminals 110 of the battery device 3 and the connection terminals 13 of the battery mounting unit 1 can be easily canceled so that the battery device 3 can be thereby separated from the battery mounting unit 1. Specifically, a force is applied to the gripper 35 of the lever 30 such that the lever 30 rotates about the fulcrum P. Accordingly, the action parts 32 of the lever 30 apply a force of causing the battery device 3 to slide in a direction in which fitting between the external terminals 110 of the battery device 3 and the connection terminals 13 of the battery mounting unit 1 is canceled. That is, by utilizing the "principle of leverage" by the lever 30, the external terminals 110 of the battery device 3 are caused to slide to cancel fitting to the connection terminals 13 of the battery mounting unit 1. Accordingly, fitting between the external terminals 110 of the battery device 3 and the connection terminals 13 of the battery mounting unit 1 can be easily canceled. Consequently, the battery device 3 can be easily separated from the battery mounting unit 1.

In addition, in this embodiment, the lever 30 is located at the side at which the connection terminals 13 of the battery mounting unit 1 are located when seen from the battery device 3, in the state where the external terminals 110 of the battery device 3 are fitted to the connection terminals 13 of the battery mounting unit 1. Thus, a force generated by rotation of the lever 30 can be applied to a portion of the battery device 3 near the fitting portion between the external terminals 110 of the battery device 3 and the connection terminals 13 of the battery mounting unit 1. Accordingly, fitting between the external terminals 110 of the battery device 3 and the connection terminals 13 of the battery mounting unit 1 can be canceled with a smaller force.

In this embodiment, the action parts 32 are located between the battery device 3 and the apparatus 2 in the state where the external terminals 110 of the battery device 3 are fitted to the connection terminals 13 of the battery mounting unit 1. The lever 30 is configured such that the action parts 32 apply a force to the battery device 3 in a direction in which the battery device 3 moves away from the apparatus 2 when the lever 30 rotates about the fulcrum P by a force applied to the gripper 35.

In this manner, while the battery device 3 is moved away from the apparatus 2, fitting between external terminals 110 of the battery device 3 and the connection terminals 13 of the battery mounting unit 1 can be canceled. Consequently, the battery device 3 can be easily detached from the apparatus 2.

In this embodiment, the lever 30 rotates about the fulcrum P connected to the holder body 12 to be thereby switched between the fixed state where the battery device 3 is fixed to the battery mounting unit 1 and the unfixed state where the battery device 3 is unfixed from the battery mounting unit 1. Accordingly, attachment and detachment of the battery device 3 to/from the apparatus 2 can be easily performed by rotation of the lever 30.

In this embodiment, when seen from a direction orthogonal to the rotation plate formed by rotation of the lever 30, each of the arms 31 of the lever 30 includes the bent portion 31a between the action part 32 and the gripper 35, and the fulcrum P, which is the rotation center of the lever 30, is located at the bent portion 31a.

With this configuration, rotation of the lever 30 about the fulcrum P enables the arms 31 to be used as "levers." Accordingly, a force applied to the gripper 35 can be easily transferred to the battery device 3 by the action parts 32. Consequently, fitting between the external terminals 110 of the battery device 3 and the connection terminals 13 of the battery mounting unit 1 can be easily canceled so that the battery device 3 can be thereby detached from the apparatus 2.

In this embodiment, the lever 30 includes the pair of arms 31. The pair of arms 31 is connected to the gripper 35 such that the action parts 32 of the pair of arms 31 face each other with the battery device 3 interposed therebetween in the state where the external terminals 110 of the battery device 3 are fitted to the connection terminals 13.

Accordingly, the battery device 3 can be moved to cancel fitting between the external terminals 110 of the battery device 3 and the connection terminals 13 of the battery mounting unit 1 by the pair of arms 31 of the lever 30. Consequently, fitting between the external terminals 110 of the battery device 3 and the connection terminals 13 of the battery mounting unit 1 can be easily canceled.

In this embodiment, the connection terminals 13 of the battery mounting unit 1 are configured to fit to the external terminals 110 of the battery device 3 whose width W or length L is larger than the height H thereof.

Thus, it is difficult to detach the battery device 3 whose width W or length L is larger than the height H from the battery mounting unit by pivoting as employed in a conventional manner. On the other hand, the configuration of this embodiment applied to the battery mounting unit eases cancellation of fitting between the external terminals 110 of the battery device 3 and the connection terminals 13 of the battery mounting unit 1. That is, the configuration of this embodiment is effective especially for the battery mounting unit to which the battery device 3 having the configuration described above is mounted.

In this embodiment, a fitting force between the connection terminals 13 of the battery mounting unit 1 and the external terminals 110 of the battery device 3 is larger than a load of the battery device 3.

As described above, even in the case where the fitting force between the connection terminals 13 of the battery mounting unit 1 and the external terminals 110 of the battery device 3 is large, the configuration of the battery mounting unit 1 of this embodiment can easily cancel fitting between the connection terminals 13 of the battery mounting unit 1 and the external terminals 110 of the battery device 3. That is, the configuration of this embodiment is effective especially for the battery mounting unit having a large fitting force between the connection terminals 13 of the battery mounting unit 1 and the external terminals 110 of the battery device 3.

The configuration of this embodiment is preferably applicable to the battery mounting unit attached to an electric apparatus that is driven by electric power of the battery device 3. In the case of an electric apparatus, a relatively large current flows between external terminals of the battery device and connection terminals of the electric apparatus, and vibrations are easily applied to the battery device. Thus, it is necessary to fit the external terminals to the connection terminals more firmly. In view of this, the configuration of this embodiment applied to the battery mounting unit attached to the electric apparatus can easily cancel fitting between the external terminals 110 of the battery device 3 and the connection terminals 13 of the battery mounting unit 1.

The configuration of this embodiment is preferably applicable to the battery mounting unit to/from which a battery device having a secondary battery can be attached and detached. In the case where the battery device includes the secondary battery, the frequency of attaching and detaching the battery device to/from the apparatus 2 is high. Thus, the configuration of this embodiment applied to the battery mounting unit enables easy detachment of the battery device 3 from the apparatus 2. Accordingly, the battery device 3 can be easily attached and detached to/from the apparatus 2.

Second Embodiment (Overall Configuration)

Figure 12:
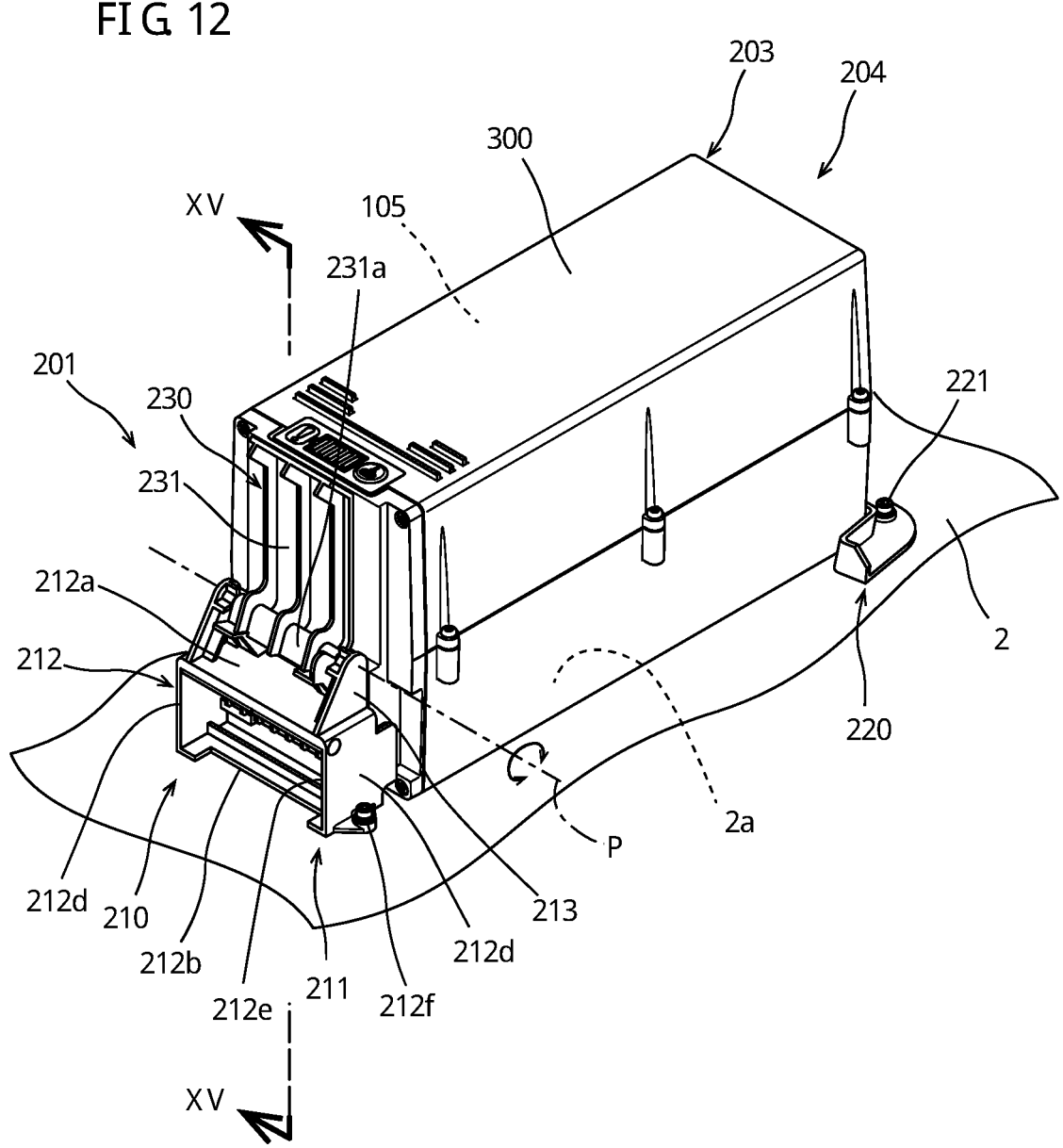
FIG. 12 illustrates a state where a battery device is mounted to a battery mounting unit according to a second embodiment, and corresponds to FIG. 1.
Figure 13:
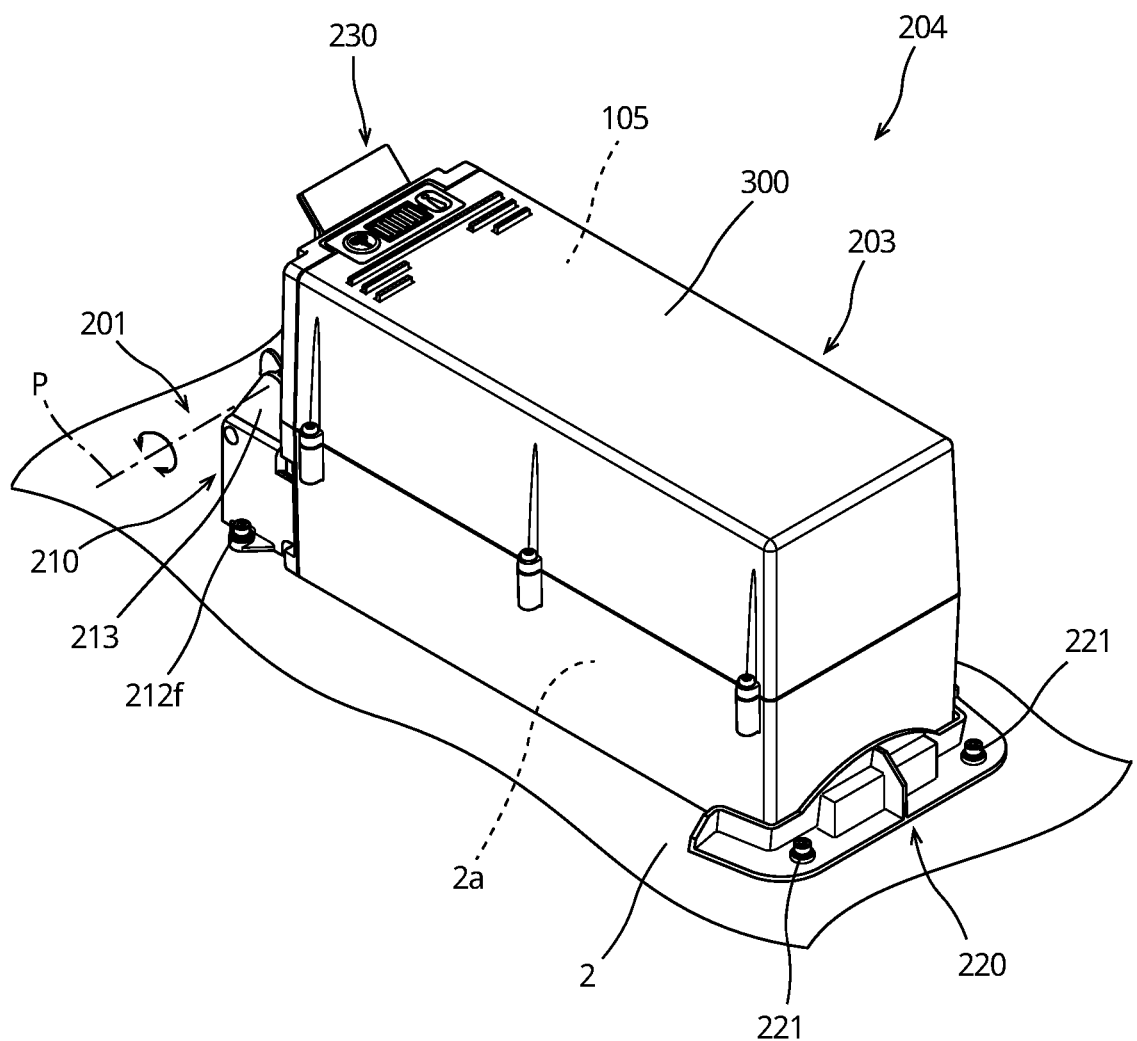
FIG. 13 illustrates the state where the battery device is mounted to the battery mounting unit according to the second embodiment, and corresponds to FIG. 2.

FIGS. 12 and 13 are perspective views illustrating a schematic configuration of a battery mounting unit 201 and a battery device 203 according to a second embodiment of the present teaching. In the battery mounting unit 201 of this embodiment, configurations of the first retainer 210 and the second retainer 220 are different from those of the first retainer 10 and the second retainer 20 of the battery mounting unit 1 in the first embodiment. In the following description, components similar to those of the first embodiment are denoted by the same reference characters and will not be described again, and components different from those of the first embodiment will be described.

In a manner similar to the battery mounting unit 1 of the first embodiment, the battery mounting unit 201 is attached to the apparatus 2. The battery device 203 is mounted to the battery mounting unit 201. The battery mounting unit 201 is electrically connected to an apparatus 2 by, for example, unillustrated wires such that the battery apparatus 203 can supply electric power to the apparatus 2. By mounting the battery device 203 to the battery mounting unit 201, a power supply unit 204 is constructed.

Figure 14:
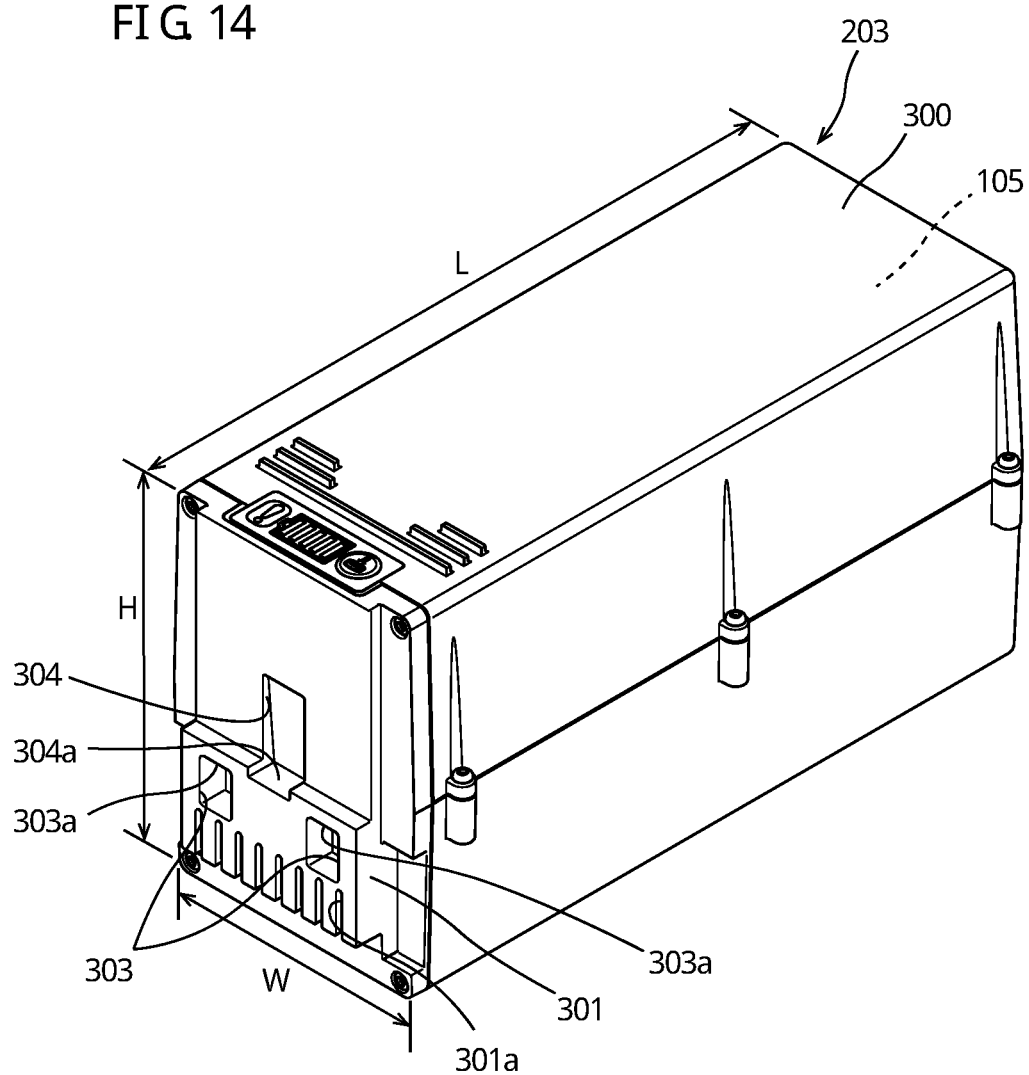
FIG. 14 is a perspective view illustrating a schematic configuration of the battery device.
Figure 15:
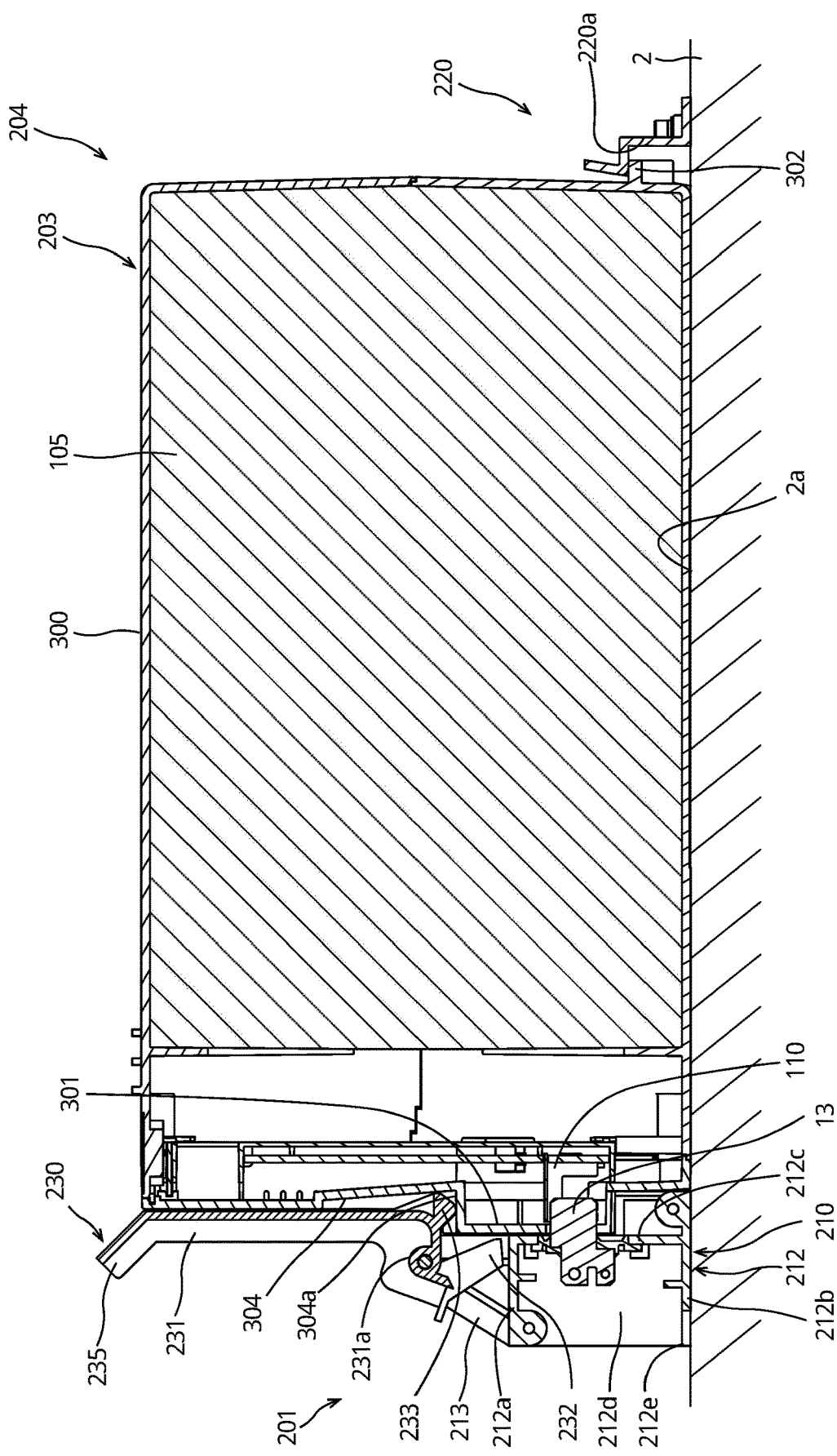
FIG. 15 is a cross-sectional view taken along line XV-XV in FIG. 12.

FIG. 14 is a perspective view illustrating a schematic configuration of the battery device 203. FIG. 15 is a cross-sectional view taken along line XV-XV in FIG. 12.

As illustrated in FIGS. 12 through 15, the battery device 203 has, for example, a rectangular parallelepiped shape. The battery apparatus 203 is attached to the battery mounting unit 201 such that the longitudinal direction of the battery apparatus 203 is oriented along the attachment surface 2a of the apparatus 2. In the following description, in a state where the battery device 203 is mounted to the battery mounting unit 201, the top-bottom direction of the battery device 203 will be referred to as a height direction, and the left-right direction of the battery device 203 will be referred to as a width direction. In the state where the battery device 203 is mounted to the battery mounting unit 201, a dimension in the length dimension L (length) or a dimension in the width direction W (width) is larger than a dimension in the height direction H (height). In the battery device 203 of this embodiment in the state of being mounted to the battery mounting unit 201, the length L is larger than the height H, and the height H is larger than the width W.

The battery device 203 includes a casing 300 having a rectangular parallelepiped shape, a lithium ion battery 105 housed in the casing 300, and external terminals 110.

The casing 300 is a resin product having a rectangular parallelepiped shape, for example. As illustrated in FIG. 15, the casing 300 has a first projection 301 projecting in the longitudinal direction at one longitudinal end thereof, and has a second projection 302 projecting in the longitudinal direction at the other longitudinal end thereof. The first projection 301 and the second projection 302 are disposed below the center of the casing 300 in the height direction at longitudinal ends of the casing 300. The casing 300 may be made of a material except for a resin, and/or may have a shape except for the rectangular parallelepiped shape.

Figure 19:
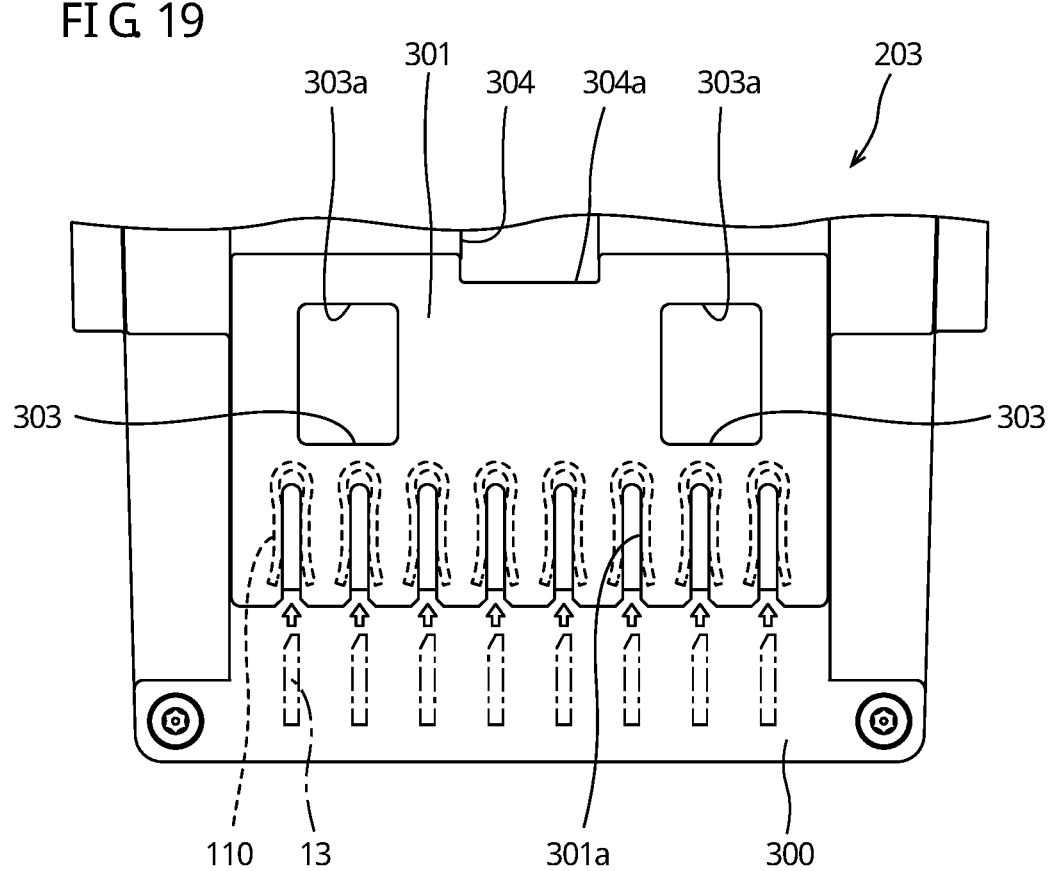
FIG. 19 is a view of a first projection of the battery device seen from one longitudinal end.

The first projection 301 is retained by a first retainer 210 of the battery mounting unit 201 described later. As illustrated in FIGS. 14 and 19, the first projection 301 includes a plurality of slits 301a configured to house the external terminals 110. The plurality of slits 301a are provided in the first projection 301 to extend in the top-bottom direction and to be open at the bottom. FIG. 19 is a view of the first projection 301 of the battery device 203 seen from one longitudinal end.

The external terminals 110 are disposed in the slits 301a of the first projection 301, that is, at one longitudinal end of the casing 300. As illustrated in FIG. 19, each of the external terminals 110 is a part made of a U-shaped conductive material, and is open downward in a corresponding one of the slits 301a of the first projection 301 in the casing 300.

As illustrated in FIGS. 14 and 19, the casing 300 includes a pair of first recesses 303 and a second recess 304 at one longitudinal end.

The second recess 304 is located above the first projection 301 and at the center of the battery device 203 in the width direction. The second recess 304 is formed across a side surface of the casing 300 at one longitudinal end and an upper portion of the first projection 301. That is, the second recess 304 is disposed in the casing 300 and has a substantially L shape when seen in the width direction of the battery device 203.

The second recess 304 has a second load receiving surface 304a near the first projection 301. The second load receiving surface 304a contacts a second protrusion 233 of a lever 230 described later when the battery device 203 is mounted to the first retainer 210 of the battery mounting unit 201. That is, when the lever 230 rotates about a fulcrum P toward the battery device 203, a downward force is applied to the second load receiving surface 304a by the second protrusion 233 of the lever 230. Accordingly, one longitudinal end of the battery device 203 can be pushed downward against the first retainer 210.

The pair of first recesses 303 is located at both ends of the battery device 203 in the width direction in the first projection 301. The pair of first recesses 303 is recessed in the longitudinal direction of the casing 300. First protrusions 232 of the lever 230 are located in the pair of first recesses 303 in separating the battery device 203 from the first retainer 210 of the battery mounting unit 201.

Each of the pair of first recesses 303 has a first load receiving surface 303a at the upper side thereof. The first load receiving surfaces 303a contact the first protrusions 232 of the lever 230 when the battery device 203 is separated from the first retainer 210 of the battery mounting unit 201. That is, as will be described later, when the lever 230 rotates about the fulcrum P in the direction opposite to the battery device 203, an upward force is applied to the first load receiving surface 303a by the first protrusions 232 of the lever 230. Accordingly, one longitudinal end of the battery device 203 can be separated upward from the first retainer 210.

In this embodiment, the battery device 203 includes the first recesses 303 having the first load receiving surfaces 303a, and the second recess 304 having the second load receiving surface 304a. Alternatively, unlike this embodiment, the battery device does not need to include a recess that is recessed from the surface as long as the battery device has the first load receiving surface and the second load receiving surface. That is, the battery device may include a structure except for a recess, such as a projection or a notch, as long as the structure has a first load receiving surface engageable with the first protrusions 232 of the battery mounting unit 201 and a second load receiving surface engageable with the second protrusion 233.

(Battery Mounting Unit)

As illustrated in FIGS. 12 and 13, the battery mounting unit 201 includes the first retainer 210 and the second retainer 220. Each of the first retainer 210 and the second retainer 220 is fixed to the apparatus 2 with the battery apparatus 203 interposed therebetween. That is, the first retainer 210 is located at one longitudinal end of the battery device 203, and the second retainer 220 is located at the other longitudinal end of the battery device 203. Both of the longitudinal ends of the battery device 203 in the state of being mounted to the battery mounting unit 201 are retained by the first retainer 210 and the second retainer 220. In this manner, the battery apparatus 203 is fixed to the apparatus 2 with the battery mounting unit 201 interposed therebetween.

Figure 16:
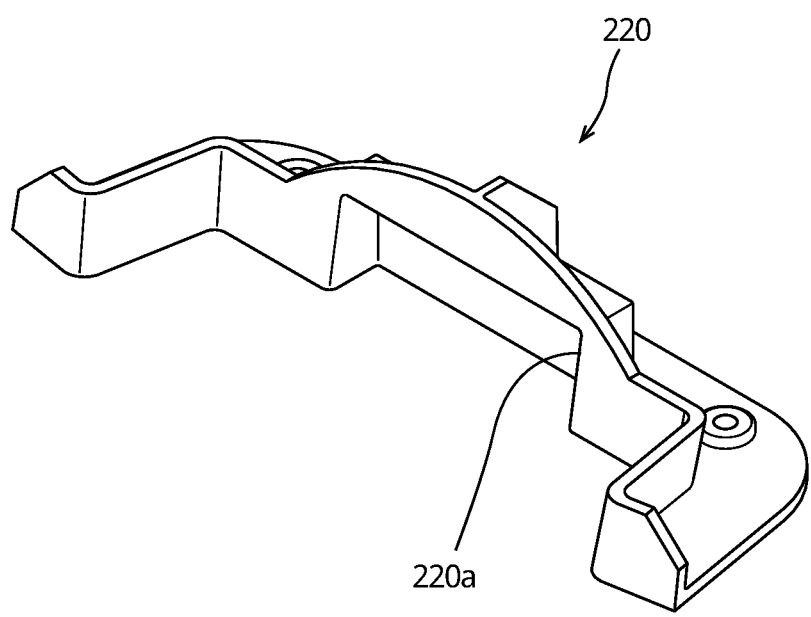
FIG. 16 is a perspective view illustrating a schematic configuration of a second retainer of the battery mounting unit.
Figure 17:
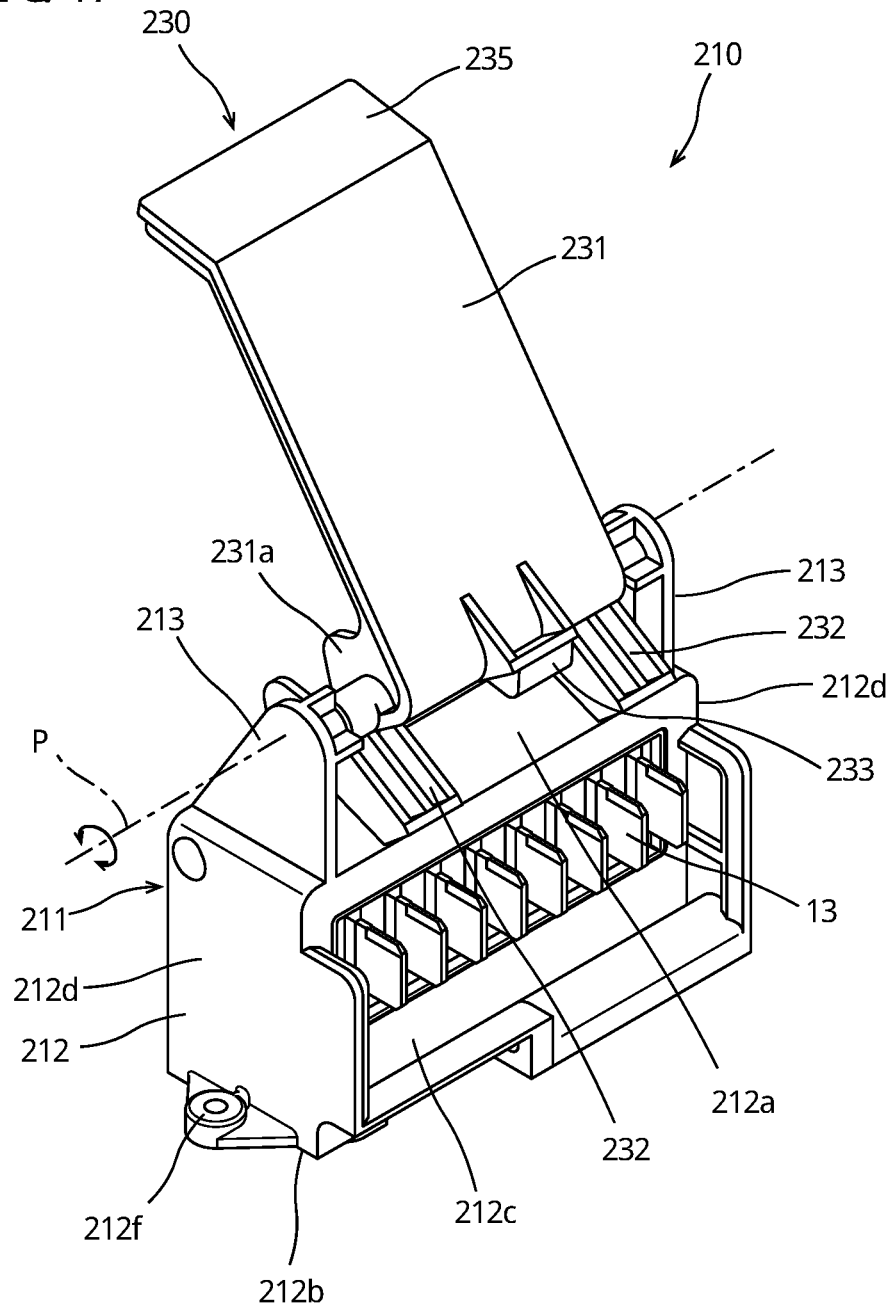
FIG. 17 is a perspective view illustrating a schematic configuration of a first retainer of the battery mounting unit.

FIG. 16 is a perspective view illustrating a schematic configuration of the second retainer 220. FIG. 17 is a perspective view illustrating a schematic configuration of the first retainer 210.

As illustrated in FIG. 16, the second retainer 220 has a C shape when seen from above. Thus, the second retainer 220 enables positioning of the longitudinal ends of the casing 300 of the battery device 203 in the width direction of the casing 300.

The second retainer 220 has a recess 220a in which the second projection 302 of the casing 300 of the battery device 203 is inserted. The second projection 302 of the casing 300 of the battery device 203 is positioned in the recess 220a of the second retainer 220 so that the other longitudinal end of the casing 300 of the battery device 203 can be thereby retained by the second retainer 220. The second retainer 220 is fixed to the apparatus 2 with bolts 221.

As illustrated in FIGS. 12 and 15, the first retainer 210 retains one longitudinal end of the casing 300 of the battery device 203. As illustrated in FIG. 17, the first retainer 210 includes a connection terminal holder 211 and the lever 230. The connection terminal holder 211 is fixed to the apparatus 2. The connection terminal holder 211 includes, therein, connection terminals 13 that are fitted to the external terminals of the battery device 203. The lever 230 is disposed in the connection terminal holder 211.

The connection terminal holder 211 includes a holder body 212 and the connection terminals 13.

The holder body 212 is a metal part having a substantially rectangular parallelepiped shape, for example. As illustrated in FIGS. 12 and 17, the holder body 212 includes a holder upper portion 212a, a holder bottom portion 212b, a holder side portion 212c, and a pair of holder end portions 212d. The holder side portion 212c is located at a side of the holder body 212 facing the battery device 203 in the state where the battery device 203 is mounted to the battery mounting unit 201.

The holder upper portion 212a is located at the top of the holder body 212. As illustrated in FIGS. 12 and 17, the holder upper portion 212a has a pair of lever supports 213 that rotatably supports the lever 230 described later. The pair of lever supports 213 extends upward from both longitudinal ends of the holder body 212 in the holder upper portion 212a. The lever 230 is rotatably supported on upper portions of the pair of lever supports 213.

The holder bottom portion 212b is located at the bottom of the holder body 212. The holder side portion 212c is located at one lateral end of the holder body 212, and extends in the longitudinal direction of the holder body 212. As illustrated in FIGS. 12 and 17, the holder end portions 212d are individually located at both longitudinal ends of the holder body 212.

As illustrated in FIGS. 12 and 15, the holder body 212 has an opening 212e at a side opposite to the holder side portion 212c in the lateral direction. The holder body 212 may not include the opening 212e.

In this embodiment, the holder body 212 also includes fixing portions 212f. The holder body 212 is fixed to the apparatus 2 by the fixing portions 212f.

As illustrated in FIGS. 15 and 17, the plurality of connection terminals 13 are disposed on the holder side portion 212c of the holder body 212. The connection terminals 13 are plate-shaped conductive metal parts each having a substantially rectangular shape in plan view.

The plurality of connection terminals 13 penetrate the holder side portion 212c in the thickness direction (lateral direction of the holder body 212), and are arranged side by side in the longitudinal direction of the holder body 212 such that the thickness direction of the connection terminals 13 coincides with the longitudinal direction of the holder body 212. That is, the connection terminals 13 are arranged in parallel at predetermined intervals in the thickness direction when viewed from above. The connection terminals 13 are electrically connected to the apparatus 2 by unillustrated wires.

Each of the connection terminals 13 is sandwiched in a corresponding one of the U-shaped external terminals 110 of the battery device 203 in the thickness direction in the state where the battery device 203 is mounted to the battery mounting unit 201. As described above, each of the external terminals 110 of the battery device 203 has a U shape, and is configured to be elastically deformable to produce an elastic restoring force by opening at the opening side (see FIG. 19). Thus, as illustrated in FIG. 19, the connection terminals 13 are inserted into the openings of the external terminals 110 of the battery device 203 in the state where the battery device 203 is mounted to the battery mounting unit 201 so that the connection terminals 13 are thereby fitted to the external terminals 110. A fitting force between the connection terminals 13 of the battery mounting unit 201 and the external terminals 110 of the battery device 203 is larger than a load of the battery device 203. The fitting force is, for example, about 0.04 kN, and a load of the battery device 203 is, for example, about 0.02 kN. In this embodiment, the load of the battery device 203 corresponds to a force with which the self-weight of the battery device 203 is exerted on a second protrusion 233 of the lever 230 described later in a case where the battery device 203 is supported by the second protrusion 233.

As described above, the plurality of connection terminals 13 are arranged in parallel with predetermined intervals in the thickness direction when viewed from above. Thus, the external terminals 110 of the battery device 203 to be fitted to the connection terminals 13 are slidable in the top-bottom direction relative to the connection terminals 13.

Figure 18:
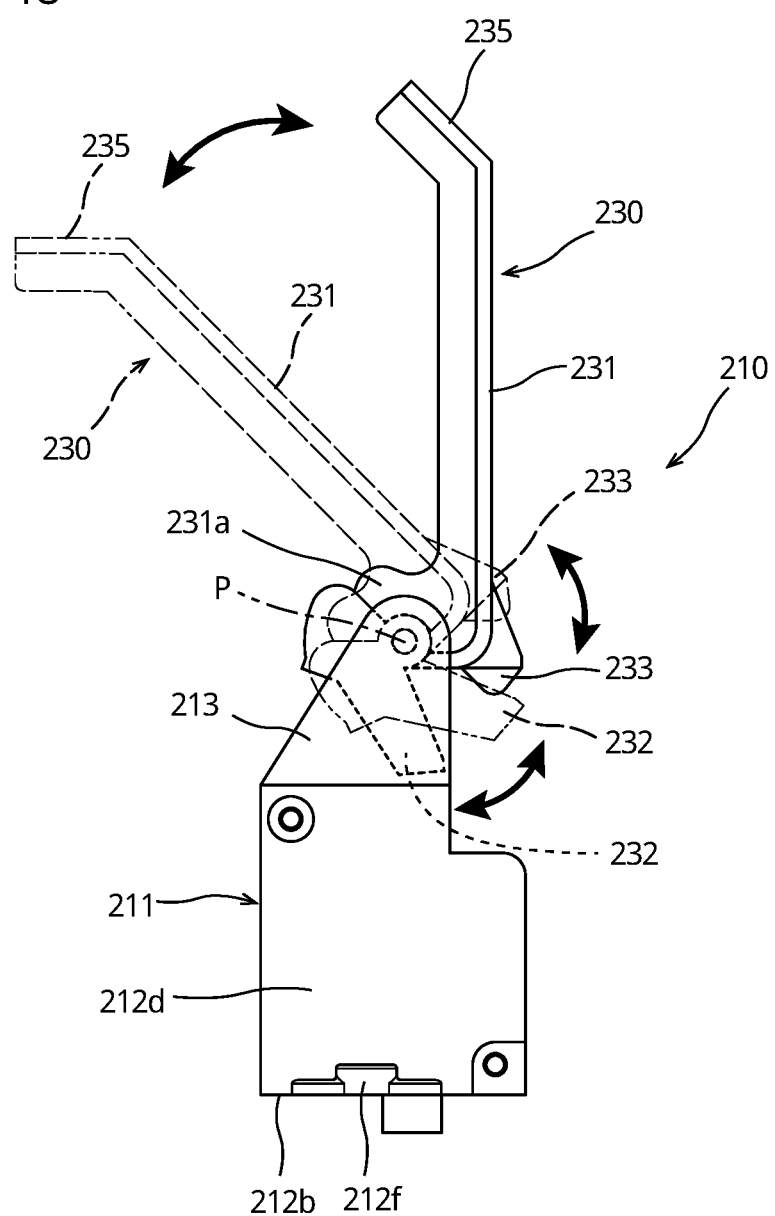
FIG. 18 is a side view illustrating a state where a lever rotates.

The lever 230 is rotatably supported by the holder body 212 (see FIG. 18). That is, as illustrated in FIGS. 12, 13, and 15, the lever 230 is located at the side at which the connection terminals 13 of the battery mounting unit 201 are located when seen from the battery device 203, in the state where the external terminals 110 of the battery device 203 are fitted to the connection terminals 13 of the battery mounting unit 201. As illustrated in FIG. 18, the lever 230 rotates about a support point (fulcrum P) of the lever support 213 of the holder body 212 (indicated by the solid arrow) to be thereby switched between a fixed state where the battery device 203 is fixed to the battery mounting unit 201 (the state illustrated in FIG. 12 and indicated by the solid line in FIG. 18) and an unfixed state where fixing of the battery device 203 to the battery mounting unit 201 is canceled (the state illustrated in FIG. 21 and indicated by the chain double-dashed line in FIG. 18). As will be described later, the unfixed state is a state where fitting between the connection terminals 13 of the battery mounting unit 201 and the external terminals 110 of the battery device 203 is canceled. FIG. 18 is a view illustrating the state where the lever 230 rotates when seen sideways.

As illustrated in FIGS. 12 and 15, the lever 230 is disposed such that an arm 231 described later extends along the casing 300 of the battery device 203 while the external terminals 110 of the battery device 203 are fitted to the connection terminals 13 of the battery mounting unit 201, that is, the lever 230 is in the fixed state.

As illustrated in FIG. 17, the lever 230 includes the arm 231 having a flat plate shape, a pair of first protrusions 232 (first action part), a second protrusion 233 (second action part), and a gripper 235.

The arm 231 has a rectangular flat plate shape extending in one direction. The arm 231 has, at one longitudinal end (first end) thereof, a bent portion 231a (connection portion) that bends to one direction along the thickness. That is, the first end of the arm 231 bends to one side along the thickness across the entire the arm 231 in the lateral direction, thereby forming the bent portion 231a. Both lateral ends of the bent portion 231a are rotatably supported by the lever support 213 of the holder body 212. That is, the arm 231 is rotatable about the fulcrum P with respect to the lever support 213.

The second protrusion 233 is provided on the bent area of the bent portion 231a. The second protrusion 233 extends to the other side in the thickness direction and one longitudinal end with respect to the arm 231. The protrusion end of the second protrusion 233 moves downward when the arm 231 rotates about the fulcrum P in a direction in which the arm 231 stands upright.

Accordingly, in mounting the battery device 203 to the first retainer 210, the arm 231 is caused to rotate about the fulcrum P toward the battery device 203 so that the protrusion end of the second protrusion 233 contacts the second load receiving surface 304a of the second recess 304 disposed in the casing 300 of the battery device 203 and applies a downward force to the second load receiving surface 304a.

That is, the protrusion end of the second protrusion 233 serves as an action point in mounting the battery device 203 to the first retainer 210. Thus, the second protrusion 233 serves as a second action part. In separating the battery device 203 from the first retainer 210, the second protrusion 233 does not contact the casing 300 of the battery device 203.

The pair of first protrusions 232 is provided on the front end of the bent portion 231a. The pair of first protrusions 232 is provided at both lateral ends of the bent portion 231a. The pair of first protrusions 232 extends from the bent portion 231a in the same direction as the second protrusion 233. The pair of first protrusions 232 is disposed below the second protrusion 233. The protrusion ends of the pair of first protrusions 232 move upward when the arm 231 rotates about the fulcrum P in the direction in which the arm 231 falls.

Accordingly, in separating the battery device 203 from the first retainer 210, the arm 231 is caused to rotate about the fulcrum P in the direction opposite to the battery device 203 so that the first protrusions 232 contact the first load receiving surface 303a of the first recesses 303 disposed in the casing 300 of the battery device 203 and apply an upward force to the first load receiving surface 303a.

That is, protrusion ends of the first protrusions 232 serve as action points in separating the battery device 203 from the first retainer 210. Thus, the first protrusions 232 serve as first action parts. In mounting the battery device 203 to the first retainer 210, the first protrusions 232 do not contact the casing 300 of the battery device 203.

The gripper 235 is connected to the other longitudinal end of the arm 231. The gripper 235 bends to the direction in which the bent portion 231a bends, that is, to one side of the arm 231 in the thickness direction. The gripper 235 is located at the side of the arm 231 opposite to the second protrusion 233 and the first protrusions 232 with respect to the fulcrum P in the longitudinal direction of the arm 231.

The lever 230 is constituted by an integrated member. In this embodiment, the lever 230 is a metal part. Alternatively, the lever may be constituted by a plurality of parts, or may be made of a material except for a metal material.

(Operations of Attachment and Detachment of Battery Device)

Figure 20:
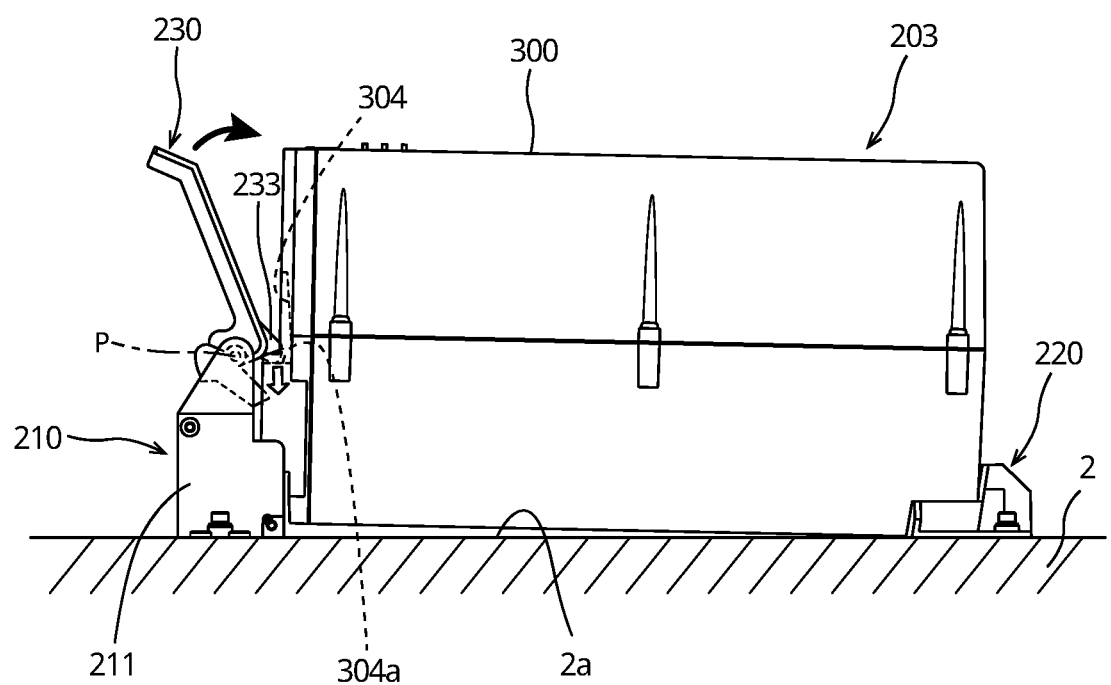
FIG. 20 is a side view illustrating mounting of the battery device to the battery mounting unit.
Figure 21:
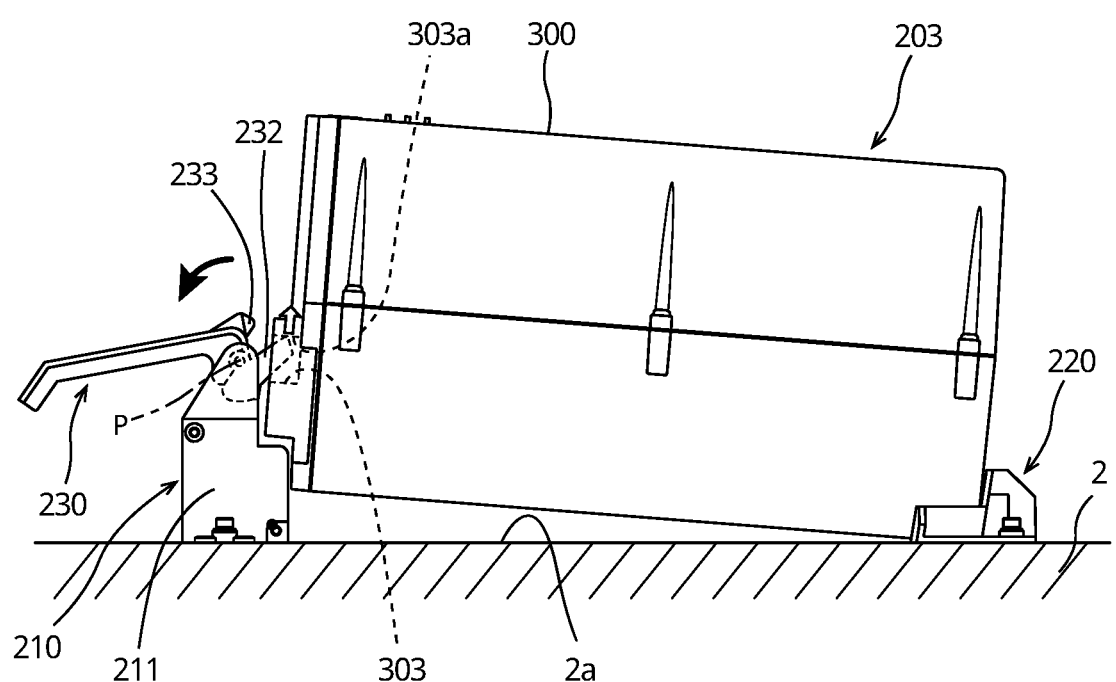
FIG. 21 is a side view illustrating detachment of the battery device from the battery mounting unit.
Figure 22:
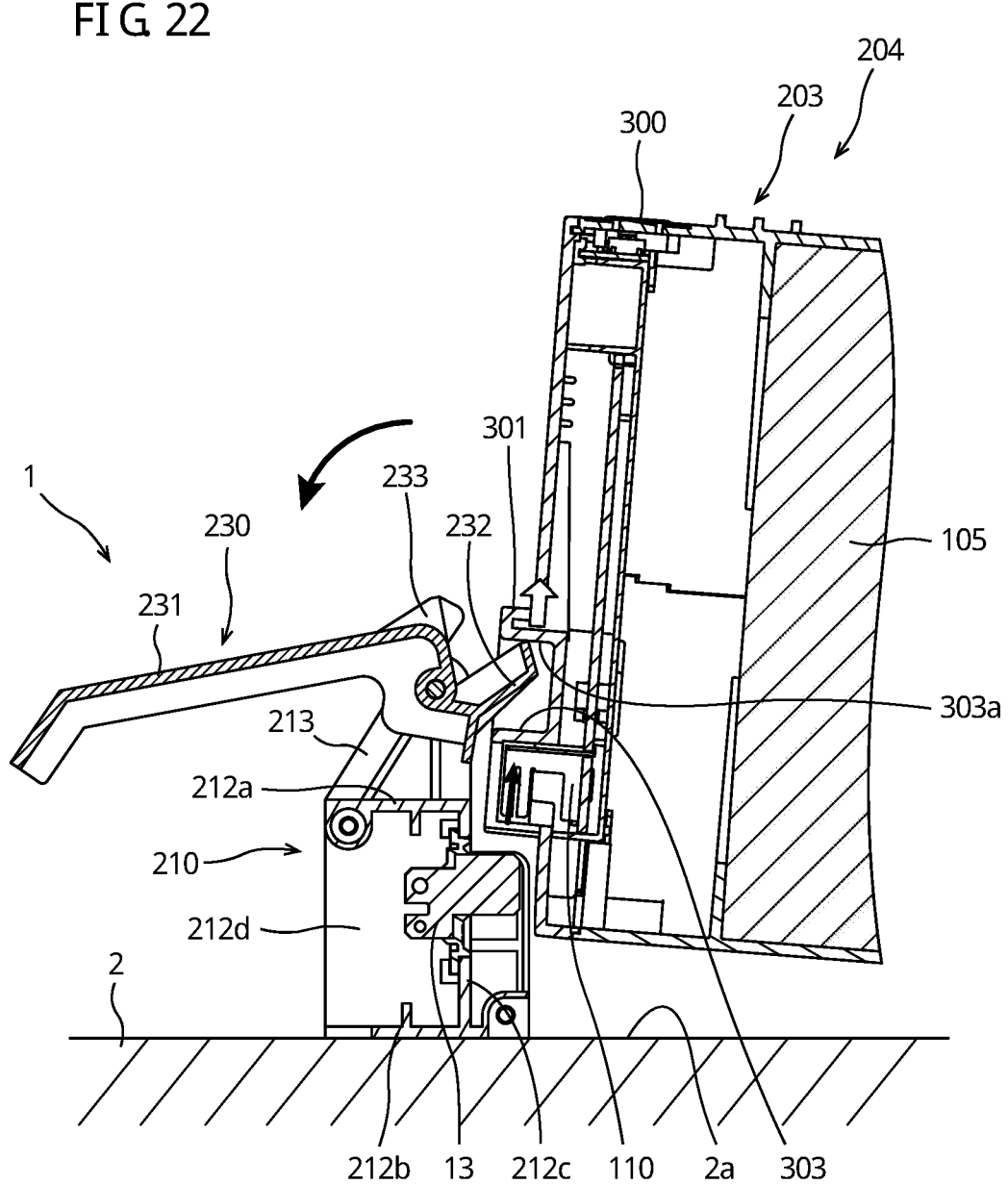
FIG. 22 is an enlarged partial view illustrating detachment of external terminals of the battery device from connection terminals of the battery mounting unit.

Next, an operation of attaching/detaching the battery device 203 to/from the battery mounting unit 201 having the configuration described above will be described with reference to FIGS. 20 through 22. FIG. 20 is a side view illustrating attachment of the battery device 203 to the battery mounting unit 201. FIG. 21 is a side view illustrating detachment of the battery device 203 from the battery mounting unit 201. FIG. 22 is an enlarged partial cross-sectional view illustrating fitting between the external terminals 110 and the connection terminals 13 in attaching/detaching the battery device 203 to/from the battery mounting unit 201.

In attaching the battery device 203 to the battery mounting unit 201, the second projection 302 of the casing 300 of the battery device 203 is first inserted in the recess 220a of the second retainer 220 of the battery mounting unit 201.

Thereafter, as illustrated in FIG. 20, the lever 230 is rotated toward the casing 300 of the battery device 203 (see the solid arrow) so that the second protrusion 233 of the lever 230 is pushed downward against the second load receiving surface 304a of the second recess 304 of the casing 300 (see the white arrow). Accordingly, the external terminals 110 of the battery device 203 are fitted to the connection terminals 13 of the first retainer 210 of the battery mounting unit 201.

At this time, with the "principle of leverage" by the lever 230, the external terminals 110 of the battery device 203 can be easily fitted to the connection terminals 13 of the battery mounting unit 201.

By rotating the lever 230 to a position at which the arm 231 extends along the casing 300 of the battery device 203, the external terminals 110 of the battery device 203 and the connection terminals 13 of the first retainer 210 are in a fitted state (see FIG. 15). This state of the lever 230 is a fixed state.

Accordingly, with the battery device 203 being mounted to the battery mounting unit 201, the battery device 203 can be retained by the first retainer 210 and the second retainer 220 of the battery mounting unit 201. In the manner described above, in the state where the battery apparatus 203 is mounted to the battery mounting unit 201, electric power is supplied from the battery apparatus 203 to the apparatus 2 through the external terminals 110 of the battery apparatus 203 and the connection terminals 13 of the battery mounting unit 201.

Then, in detaching the battery device 203 from the battery mounting unit 201, the lever 230 is rotated in the direction away from the casing 300 of the battery device 203, that is, in the direction in which the lever 230 falls (see the solid arrow). Accordingly, as illustrated in FIG. 21, the first protrusions 232 of the lever 230 contact the first load receiving surfaces 303a of the first recesses 303 of the casing 300, and thus, the first protrusions 232 apply an upward force to the first load receiving surfaces 303a (see the white arrow).

As illustrated in FIG. 22, with such rotation of the lever 230, the first protrusions 232 of the lever 230 move the one longitudinal end of the battery apparatus 203 in the direction away from the apparatus 2 such that fitting between the external terminals 110 of the battery apparatus 203 and the connection terminals 13 of the battery mounting unit 201 is canceled.

At this time, with the "principle of leverage" by the lever 230, fitting between the external terminals 110 of the battery apparatus 203 and the connection terminals 13 of the battery mounting unit 201 can be easily canceled, and one longitudinal end of the battery apparatus 203 can be easily moved away from the apparatus 2.

The rotation of the lever 230 to the position at which the arm 231 falls leads to an unfixed state where fitting between the external terminals 110 of the battery apparatus 203 and the connection terminals 13 of the first retainer 210 is canceled and one longitudinal end of the battery apparatus 203 is separated from the apparatus 2 (see FIGS. 21 and 22). This state of the lever 230 is an unfixed state.

As in the configuration of the first embodiment, the configuration of the second embodiment enables the battery device 203 to be easily separated from the battery mounting unit 201.

Specifically, this embodiment includes the first protrusions 232 serving as the first action parts that enter the first recesses 303 of the battery device 203 and apply a force to the battery device 203 through the first load receiving surfaces 303a of the first recesses 303 such that the battery device 203 slides in a direction in which fitting between the external terminals 110 and the connection terminals 13 is canceled, when the lever 230 rotates about the fulcrum P in one direction by a force applied to the gripper 235.

Accordingly, with the rotation of the lever 230, the first protrusions 232 of the lever 230 can apply a force to the first load receiving surfaces 303a of the first recesses 303 of the battery device 203 in a direction in which the battery device 203 is separated from the first retainer 210. Thus, with the rotation of the lever 230, the battery device 203 can be easily separated from the battery mounting unit 201.

In addition, this embodiment further includes the second protrusion 233 serving as the second action part that enters the second recess 304 of the battery device 203 and applies a force to the battery device 203 through the second load receiving surface 304a of the second recess 304 such that the battery device 203 slides in a direction in which the external terminals 110 are fitted to the connection terminals 13, when the lever 230 is caused to rotate about the fulcrum P in the other direction by a force applied to the gripper 235.

Accordingly, with the rotation of the lever 230, the second protrusions 233 of the lever 230 can apply a force to the second load receiving surface 304a of the second recesses 304 of the battery device 203 in a direction in which the battery device 203 is mounted to the first retainer 210. Thus, with the rotation of the lever 230, the battery device 203 can be easily mounted to the battery mounting unit 201.

In this embodiment, the first protrusions 232 are disposed closer to the apparatus 2 than the second protrusion 233 in the lever 230.

As in the configuration of the first embodiment, in the configuration of the second embodiment, the direction in which the battery apparatus 203 moves away from the apparatus 2 is a direction in which the external terminals 110 of the battery apparatus 203 are slidable with respect to the connection terminals 13 of the first retainer 210 of the battery mounting unit 201. Thus, the presence of the first protrusions 232 in the lever 230 enables the battery device 203 to be more easily separated from the apparatus 2 by the first protrusions 232. Specifically, since the first protrusions 232 are located closer to the apparatus 2 than the second protrusion 233, rotation of the lever 230 can cancel fitting between the external terminals 110 of the battery apparatus 203 and the connection terminals 13 while easily lifting the battery apparatus 203 from the apparatus 2.

Third Embodiment (Overall Configuration)

Figure 23:
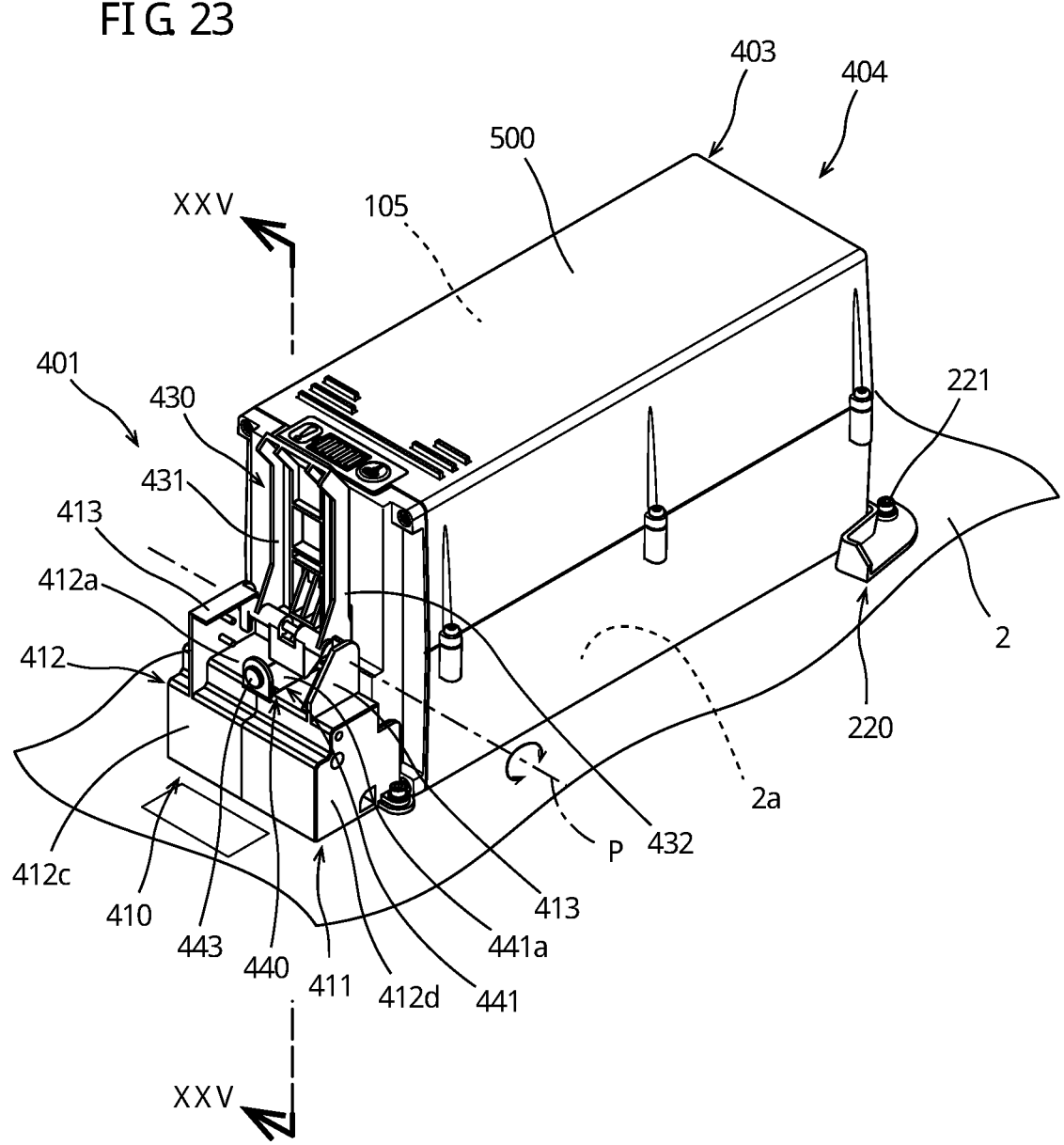
FIG. 23 illustrates a state where a battery device is mounted to a battery mounting unit according to a third embodiment, and corresponds to FIG. 1.

FIG. 23 is a perspective view illustrating a schematic configuration of a battery mounting unit 401 and a battery device 403 according to a third embodiment of the present teaching. In the battery mounting unit 401 of this embodiment, the configuration of the first retainer 410 is different from that of the first retainer 210 of the battery mounting unit 201 in the second embodiment. In the following description, components similar to those of the second embodiment are denoted by the same reference characters and will not be described again, and components different from those of the second embodiment will be described.

In a manner similar to the battery mounting unit 201 of the second embodiment, the battery mounting unit 401 is attached to an apparatus 2. The battery device 403 is mounted to the battery mounting unit 401. The battery mounting unit 401 is electrically connected to the apparatus 2 by, for example, unillustrated wires such that the battery device 403 can supply electric power to the apparatus 2. By mounting the battery device 403 to the battery mounting unit 401, a power supply unit 404 is constructed.

Figure 24:
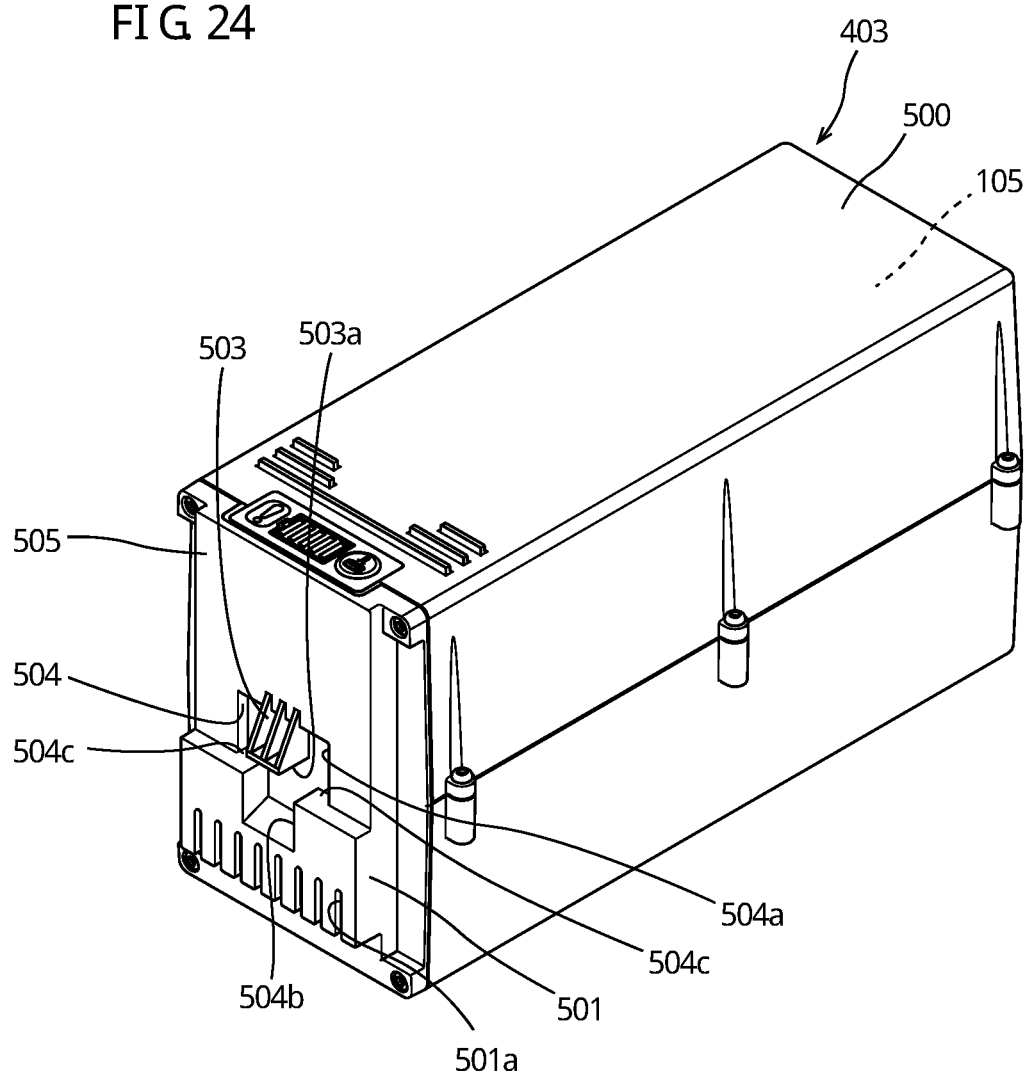
FIG. 24 is a perspective view illustrating a schematic configuration of the battery device.
Figure 25:
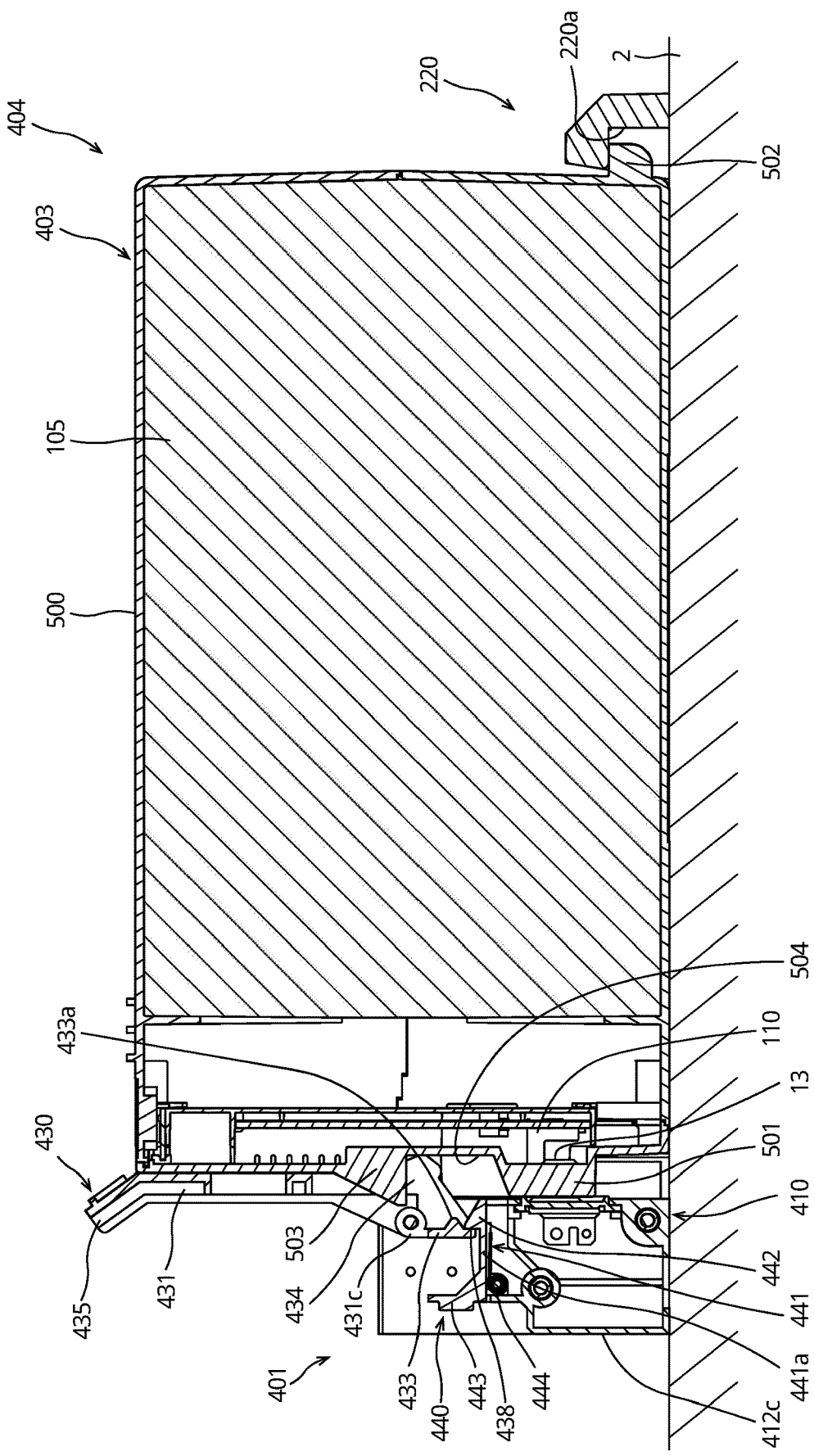
FIG. 25 is a cross-sectional view taken along line XXV-XXV in FIG. 23.

FIG. 24 is a perspective view illustrating a schematic configuration of the battery device 403. FIG. 25 is a cross-sectional view taken along line XXV-XXV in FIG. 23.

As illustrated in FIGS. 23 through 25, the battery device 403 has a rectangular parallelepiped shape, for example. The battery device 403 is attached to the battery mounting unit 401 such that the longitudinal direction of the battery device 403 is oriented along an attachment surface 2a of the apparatus 2.

As in the second configuration, the battery device 403 includes a casing 500 having a rectangular parallelepiped shape, a lithium ion battery 105 housed in the casing 500, and external terminals 110.

As illustrated in FIG. 25, the casing 500 has a first projection 501 projecting in the longitudinal direction at one longitudinal end thereof, and has a second projection 502 projecting in the longitudinal direction at the other longitudinal end thereof. The first projection 501 and the second projection 502 are disposed below the center of the casing 500 in the height direction at longitudinal ends of the casing 500.

The first projection 501 is retained by a first retainer 410 of the battery mounting unit 401 described later. As illustrated in FIG. 24, the first projection 501 includes a plurality of slits 501a configured to house the external terminals 110. The plurality of slits 501a are provided in the first projection 501 to extend in the top-bottom direction and to be open at the bottom. A detailed configuration of the external terminals 110 is similar to that of the second embodiment, and thus, will not be described.

As illustrated in FIG. 24, the casing 500 includes a protrusion 503, a recess 504, and a flat portion 505, on a side provided with the first projection 501.

The flat portion 505 is located above the first projection 501. The flat portion 505 constitutes a plane located above the first projection 501 in an end surface of the casing 500 provided with the first projection 501.

The recess 504 is located at the center of the end surface of the casing 500 provided with the first projection 501, when seen in the longitudinal direction of the battery device 403. The recess 504 includes a first recess 504a formed in the flat portion 505, and a second recess 504b formed in the first projection 501 and continuous to the first recess 504a. The width of the first recess 504a is larger than the width of the second recess 504b. Thus, the recess 504 has a T shape as a whole, when seen in the longitudinal direction of the battery device 403. That is, when seen in the longitudinal direction of the battery device 403, a step is formed by the first recess 504a and the second recess 504b.

A pair of second protrusions 434 of the lever 430 described later is located in the recess 504, in mounting the battery device 403 to the first retainer 410 of the battery mounting unit 401. A protrusion support 433 of the lever 430 described later is located in the recess 504, in separating the battery device 403 from the first retainer 410 of the battery mounting unit 401.

The recess 504 has a pair of second load receiving surfaces 504c constituting side surfaces of the first recess 504a and constituting the step. In mounting the battery device 403 to the first retainer 410 of the battery mounting unit 401, the pair of second protrusions 434 of the lever 430 described later contact the pair of second load receiving surfaces 504c. That is, when the lever 430 rotates about the fulcrum P toward the battery device 403, the pair of second protrusions 434 of the lever 430 applies a downward force to the pair of second load receiving surfaces 504c. Accordingly, one longitudinal end of the battery device 403 can be pushed downward against the first retainer 410.

The protrusion 503 is located above the recess 504 and at the center of the recess 504 in the width direction. The protrusion 503 extends downward from the center of the upper end (portion connected to the flat portion 505) of the recess 504. The protrusion 503 has a substantially triangle shape when seen in the width direction of the battery device 403, and has a first load receiving surface 503a extending in parallel with an attachment surface 2a to which the battery mounting unit 401 is attached, when seen in the longitudinal direction of the casing 500. The protrusion 503 is located in an opening 436 of the lever 430 described later, in mounting the battery device 403 to the first retainer 410 of the battery mounting unit 401.

A first protrusion 433a of the lever 430 described later contacts the first load receiving surface 503a of the protrusion 503, in separating the battery device 403 from the first retainer 410 of the battery mounting unit 401. Specifically, when the lever 430 rotates about the fulcrum P in the direction opposite to the battery device 403 as will be described later, the first protrusion 433a of the lever 430 applies an upward force to the first load receiving surface 503a. Accordingly, one longitudinal end of the battery device 403 can be separated upward from the first retainer 410.

(Battery Mounting Unit)

As illustrated in FIGS. 23 and 25, the battery mounting unit 401 includes the first retainer 410 and the second retainer 220. Each of the first retainer 410 and the second retainer 220 is fixed to the apparatus 2 with the battery device 403 interposed therebetween. That is, the first retainer 410 is located at one longitudinal end of the battery device 403, and the second retainer 220 is located at the other longitudinal end of the battery device 403. Both of the longitudinal ends of the battery device 403 in the state of being mounted to the battery mounting unit 401 are retained by the first retainer 410 and the second retainer 220. In this manner, the battery device 403 is fixed to the apparatus 2 with the battery mounting unit 401 interposed therebetween. A configuration of the second retainer 220 is similar to that of the second embodiment, and thus, will not be described.

Figure 26:
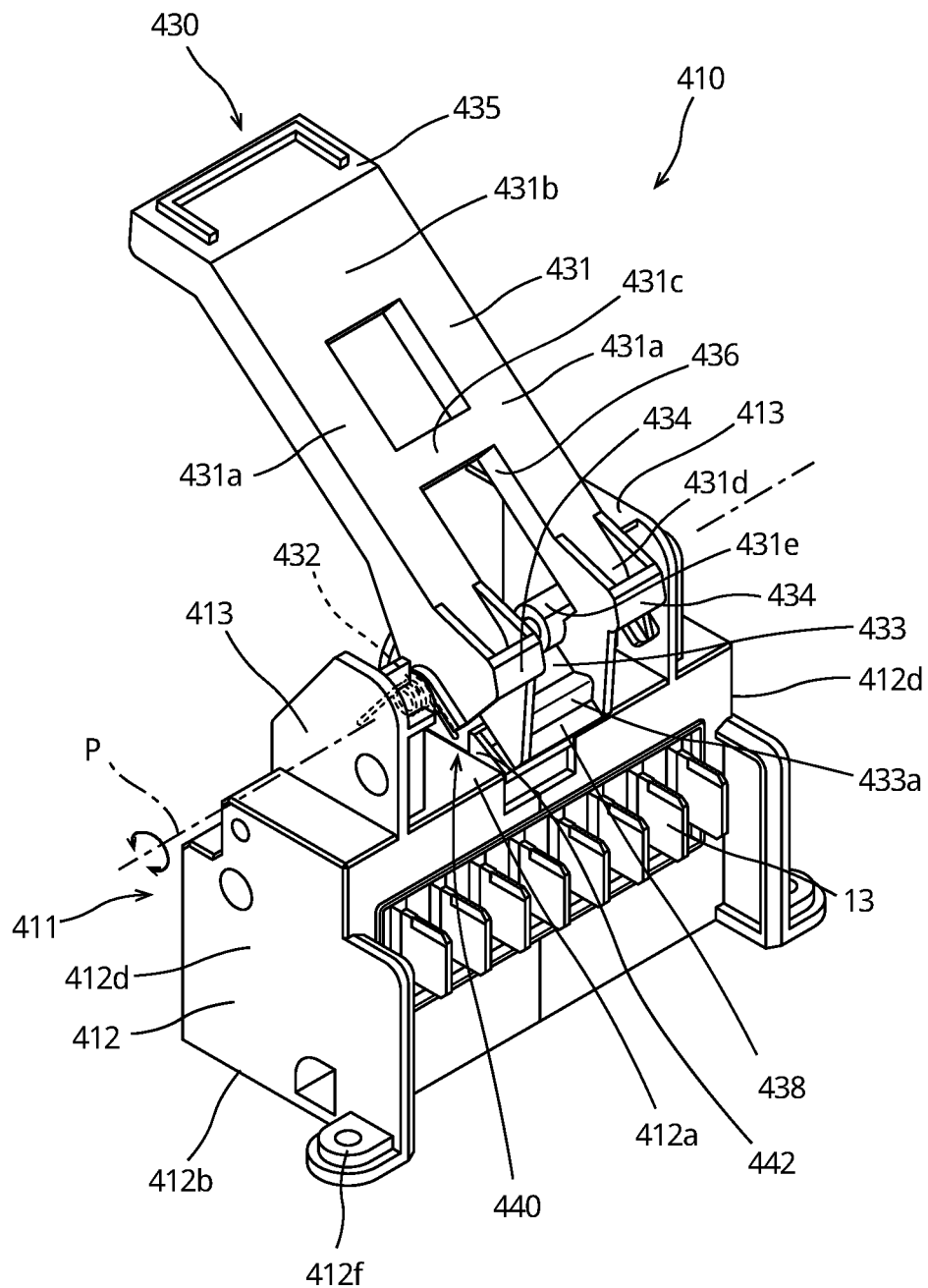
FIG. 26 is a perspective view illustrating a schematic configuration of a first retainer of the battery mounting unit.

FIG. 26 is a perspective view illustrating a schematic configuration of the first retainer 410. As illustrated in FIGS.

23 and 25, the first retainer 410 retails one longitudinal end of the casing 500 of the battery device 403.

As illustrated in FIG. 26, the first retainer 410 includes a connection terminal holder 411, the lever 430, and a lock mechanism 440. The connection terminal holder 411 is fixed to the apparatus 2. The connection terminal holder 411 includes, therein, connection terminals 13 that are fitted to the external terminals of the battery device 403. The lever 430 and the lock mechanism 440 are disposed in the connection terminal holder 411.

The connection terminal holder 411 includes a holder body 412 and the connection terminals 13. A configuration of the connection terminals 13 is similar to that of the second embodiment, and thus, will not be described.

The holder body 412 is a member having a substantially rectangular parallelepiped shape. The holder body 412 is oriented to have its longitudinal direction extend along the width direction of the battery device 403. As illustrated in FIGS. 23 and 26, the holder body 412 includes a holder upper portion 412a, a holder bottom portion 412b, a holder side portion 412c, and a pair of holder end portions 412d. The holder side portion 412c is located at the side opposite to the side of the holder body 412 to which the battery device 403 is mounted.

The holder upper portion 412a is located at the top of the holder body 412. As illustrated in FIGS. 23 and 26, the holder upper portion 412a has a pair of lever supports 413 that rotatably supports the lever 430 described later. The pair of lever supports 413 is located longitudinally inward of both longitudinal ends of the holder upper portion 412a, and extends upward. The lever 430 is rotatably supported on upper portions of the pair of lever supports 413. The lever supports may be disposed at, for example, both ends of the holder upper portion as long as the lever supports can rotatably support the lever.

The lock mechanism 440 described later is disposed at the center of the holder upper portion 412a in the longitudinal direction.

The holder bottom portion 412b is located at the bottom of the holder body 412. The holder side portion 412c is located at one lateral end of the holder body 412, and extends in the longitudinal direction of the holder body 412. The pair of holder end portions 412d is located at both longitudinal ends of the holder body 412.

A rotation shaft rotatably supporting the lock mechanism 440 described later is disposed inside the holder body 412 and extends along the connection portion between the holder upper portion 412a and the holder side portion 412c.

In this embodiment, the holder body 412 also includes fixing portions 412f. The holder body 412 is fixed to the apparatus 2 by the fixing portions 412f.

Figure 27:
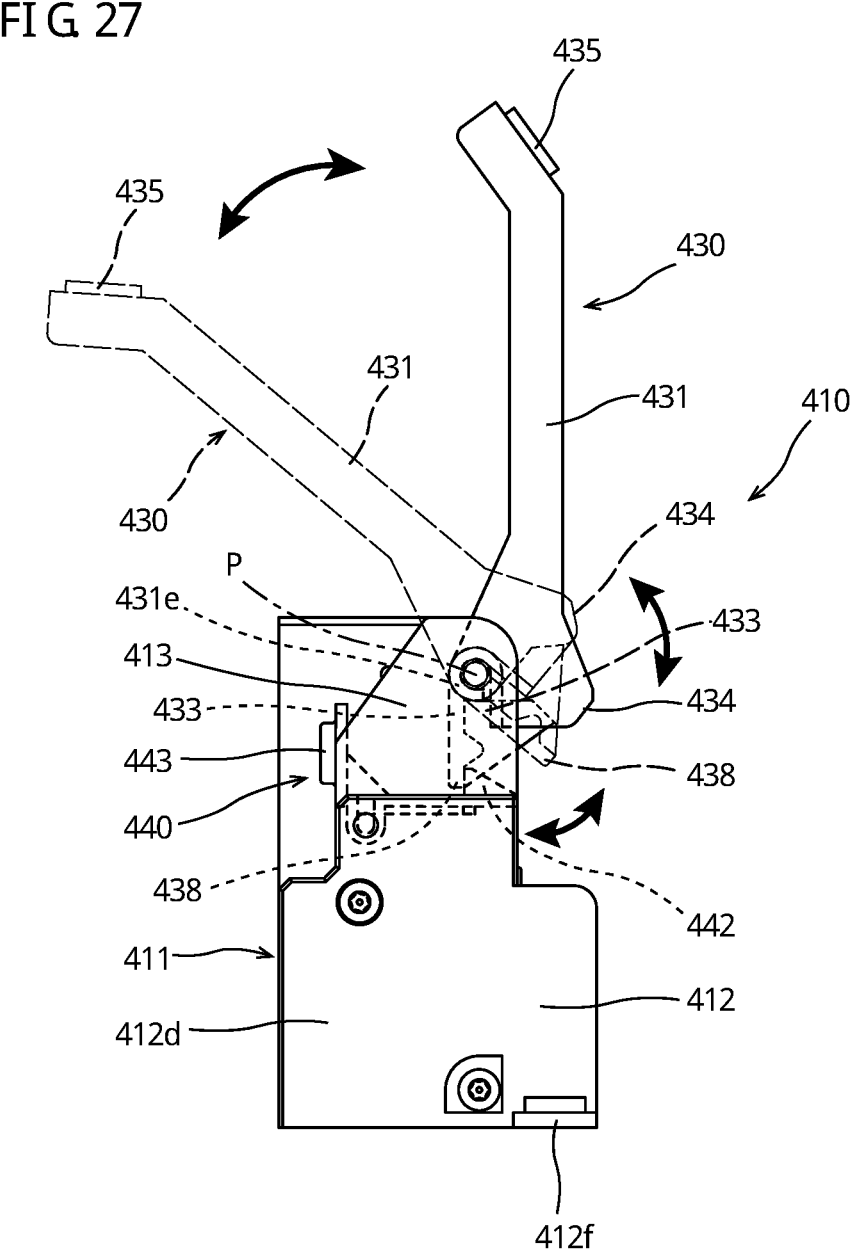
FIG. 27 is a side view illustrating a state where a lever rotates.

The lever 430 is rotatably supported by the holder body 412 (see FIG. 27). As illustrated in FIG. 27, the lever 430 rotates about a support point (fulcrum P) of the lever support 413 of the holder body 412 (indicated by the solid arrow) to be thereby switched between a fixed state where the battery device 403 is fixed to the battery mounting unit 401 (the state illustrated in FIG. 23 and indicated by the solid line in FIG. 27) and an unfixed state where fixing of the battery device 403 to the battery mounting unit 401 is canceled (the state illustrated in FIG. 29 and indicated by the chain double-dashed line in FIG. 27). As will be described later, the unfixed state is a state where fitting between the connection terminals 13 of the battery mounting unit 401 and the external terminals 110 of the battery device 403 is canceled. FIG. 27 is a view illustrating the state where the lever 430 rotates when seen sideways.

As illustrated in FIGS. 23 and 25, the lever 430 is disposed such that an arm 431 described later extends along the casing 500 of the battery device 403 while the external terminals 110 of the battery device 403 are fitted to the connection terminals 13 of the battery mounting unit 401, that is, the lever 430 is in the fixed state.

As illustrated in FIG. 26, the lever 430 includes the arm 431, the protrusion support 433, the pair of second protrusions 434 (second action part), and a gripper 435. The lever 430 is provided with a lever biasing force application portion 432.

The arm 431 includes a pair of flat plate portions 431a extending in parallel in the longitudinal direction, a coupling portions 431b coupling the pair of flat plate portions 431a at one longitudinal end (first end), and a coupling portions 431c coupling the pair of flat plate portions 431a to each other at a substantially longitudinal center. In the arm 431, end portions 431d at the other longitudinal end (second end) of the pair of flat plate portions 431a are not coupled to each other. Accordingly, an opening 436 is formed by the pair of flat plate portions 431a and the coupling portions 431c at the second end of the arm 431.

As illustrated in FIGS. 25 and 26, the arm 431 includes holder connection portions 431e (connection portions) at the individual end portions 431d. The holder connection portions 431e are disposed at the side of the arm 431 opposite to the side at which the battery device 403 is mounted to the connection terminal holder 411 in a state where the lever 430 stands upright (the state indicated by the solid line in FIG. 27). The lever 430 is supported by the lever support 413 of the holder body 412 to be rotatable about the holder connection portions 431e. That is, the arm 431 is rotatable about the fulcrum P with respect to the lever support 413.

The pair of second protrusions 434 is disposed at the side of the end portions 431d of the arm 431 opposite to the holder connection portions 431e. The pair of second protrusions 434 projects outward from the arm 431 in the thickness direction. Specifically, the second protrusions 434 project from the arm 431 toward the side at which the battery device 403 is mounted to the connection terminal holder 411, in the state where the lever 430 stands upright (the state indicated by the solid line in FIG. 27). The pair of second protrusions 434 is formed such that the lower surfaces of the second protrusions 434 are parallel to the attachment surface 2a in the state where the lever 430 stands upright.

Accordingly, with rotation of the arm 431 about the fulcrum P toward the battery device 403 in mounting the battery device 403 to the first retainer 410, the second protrusions 434 can apply a downward force to the second load receiving surfaces 504c. Specifically, when the lever 430 is caused to rotate, the pair of second protrusions 434 contacts the second load receiving surfaces 504c of the casing 500 of the battery device 403 and applies a downward force to the second load receiving surfaces 504c.

That is, the pair of second protrusions 434 serves as action points in mounting the battery device 403 to the first retainer 410. Thus, the pair of second protrusions 434 serves as second action parts. In separating the battery device 403 from the first retainer 410, the pair of second protrusions 434 does not contact the casing 500 of the battery device 403.

The protrusion support 433 is disposed between the pair of holder connection portions 431e. The protrusion support 433 extends outward of the arm 431 and in parallel with the direction in which the arm 431 extends. That is, the protrusion support 433 extends from the arm 431 downward (in the direction orthogonal to the attachment surface 2a) in the state where the lever 430 stands upright (the state indicated by the solid line in FIG. 27). In this state, the protrusion support 433 is located below the second protrusions 434.

The protrusion support 433 includes the first protrusion 433a (first action part) and a lever end 438. The lever end 438 is located at the front end of the protrusion support 433. That is, the lever end 438 is located at the lowermost end of the lever 430 in the state where the lever 430 stands upright (the state indicated by the solid line in FIG. 27).

The first protrusion 433a is at the side at which the battery device 403 is mounted to the connection terminal holder 411 in the thickness direction of the protrusion support 433, and protrudes outward in the thickness direction. When the arm 431 rotates about the fulcrum P from the upright position to the direction in which the arm 431 falls, the first protrusion 433a moves upward together with the protrusion support 433.

Accordingly, when the arm 431 is caused to rotate about the fulcrum P to the direction opposite to the side at which the battery device 403 is mounted to the connection terminal holder 411, the protrusion 503 of the battery device 403 is lifted by the first protrusion 433a. In this manner, the battery device 403 is separated from the first retainer 410. Specifically, when the lever 430 is caused to rotate to the direction opposite to the side at which the battery device 403 is mounted to the connection terminal holder 411, the first protrusion 433a contacts the first load receiving surface 503a of the protrusion 503 disposed on the casing 500 of the battery device 403, and applies an upward force to the first load receiving surface 503a.

That is, the first protrusion 433a of the protrusion support 433 serves as an action point in separating the battery device 403 from the first retainer 410. Thus, the first protrusion 433a serves as a first action part. In mounting the battery device 403 to the first retainer 410, the first protrusion 433a does not contact the casing 500 of the battery device 403.

The gripper 435 is connected to one longitudinal end of the arm 431, that is, an end of the arm 431 opposite to the first protrusion 433a and the second protrusions 434 in the longitudinal direction. The gripper 435 is bent toward the side of the arm 431 at which the holder connection portions 431e is located. The gripper 435 is located at the side opposite to the first protrusion 433a and the second protrusions 434 with respect to the fulcrum P in the longitudinal direction of the arm 431.

The lever 430 is constituted by an integrated member. Alternatively, the lever may be constituted by a plurality of parts.

The lever biasing force application portion 432 is a helical compression coil spring extending in the axial direction, for example. The lever biasing force application portion 432 is disposed between the lever support 413 and the holder connection portions 431e at one end of the pair of holder connection portions 431e, and elastically supports the lever 430 with respect to the lever support 413. The lever biasing force application portion 432 biases the lever 430 such that the lever 430 rotates about the fulcrum P to the direction opposite to the side at which the battery device 403 is mounted to the connection terminal holder 411.

The lock mechanism 440 locks the lever 430 to the connection terminal holder 411 in the upright position. As illustrated in FIGS. 23 and 26, the lock mechanism 440 includes a lock mechanism body 441 and a lock biasing force application portion 444 (see FIG. 25).

The lock mechanism body 441 includes a flat plate portion 441a, a lock stopper portion 442, and a lock operating portion 443.

The flat plate portion 441a has a rectangular flat plate shape extending in one direction. The lock stopper portion 442 is disposed at one longitudinal end of the flat plate portion 441a and projects upward. The lock operating portion 443 is disposed at the other longitudinal end of the flat plate portion 441a and projects upward. In the lock mechanism body 441, the flat plate portion 441a, the lock stopper portion 442, and the lock operating portion 443 are integrally formed.

The lock mechanism body 441 is disposed on the holder upper portion 412a such that the lock stopper portion 442 is located at the side of the connection terminal holder 411 to which the battery device 403 is mounted, and the lock operating portion 443 is located at the opposite side of the connection terminal holder 411. Specifically, the holder upper portion 412a has a rectangular opening that is located at the center in the longitudinal direction and extends from one lateral end to the other lateral end. The lock mechanism body 441 is disposed to close the opening such that the longitudinal direction of the lock mechanism body 441 extends along the longitudinal direction of the opening.

The lock mechanism body 441 is rotatably connected to the holder body 412. Specifically, the lock mechanism body 441 is connected such that a lower portion of the lock operating portion 443 is rotatably connected to a rotation shaft disposed inside the holder body 412. The lock mechanism body 441 rotates about the rotation shaft. Accordingly, when the lock operating portion 443 is pushed toward the side of the connection terminal holder 411 to which the battery device 403 is mounted, the lock mechanism body 441 rotates about the rotation shaft such that the lock stopper portion 442 moves downward.

In this embodiment, the lock mechanism 440 is constituted by an integrated member. Alternatively, the lock mechanism may be constituted by a plurality of parts.

The lock biasing force application portion 444 is a helical compression coil spring extending in the axial direction, for example. The lock biasing force application portion 444 is disposed on the rotation shaft to bias the lock mechanism body 441 upward. The lock biasing force application portion 444 elastically supports the lock mechanism body 441 such that the flat plate portion 441a of the lock mechanism body 441 constitutes a flat plane together with the holder upper portion 412a. That is, the lock biasing force application portion 444 biases the lock mechanism body 441 such that the lock stopper portion 442 of the lock mechanism body 441 moves upward about the rotation shaft.

The lock mechanism 440 locks the lever 430 with respect to the connection terminal holder 411 in a state where the lever end 438 located at the lowermost end of the lever 430 while the arm 431 stands upright, and the lock stopper portion 442 protruding above the lock mechanism 440 are engaged with each other.

(Operations of Attachment and Detachment of Battery Device)

Figure 28:
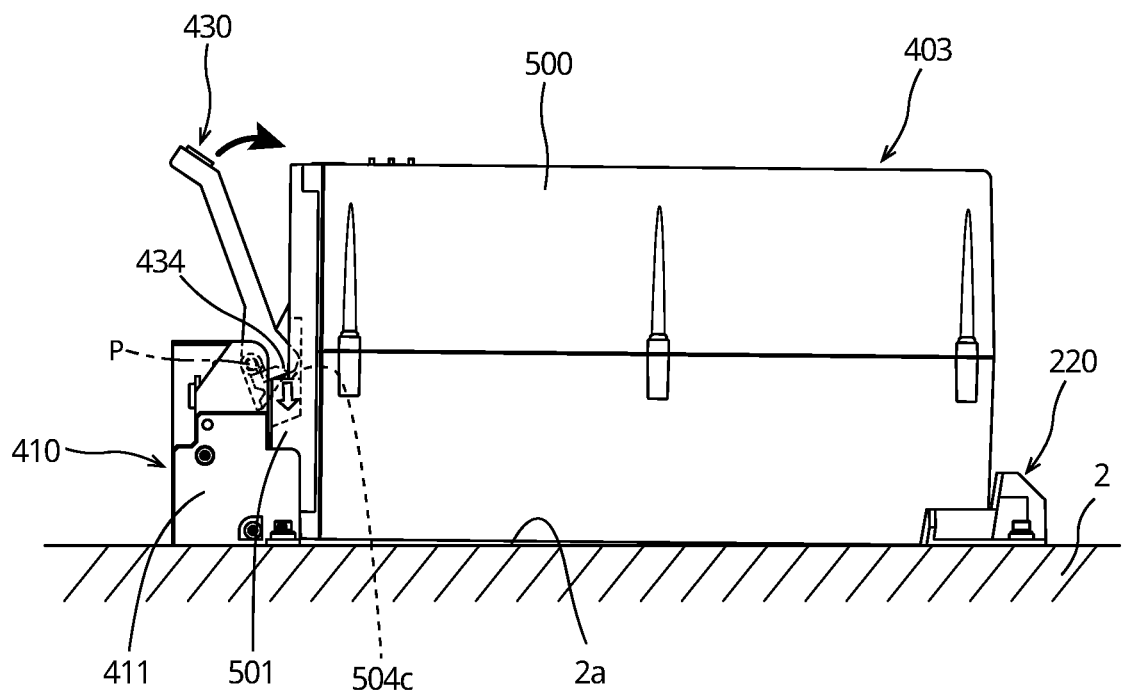
FIG. 28 is a side view illustrating mounting of the battery device to the battery mounting unit.
Figure 29:
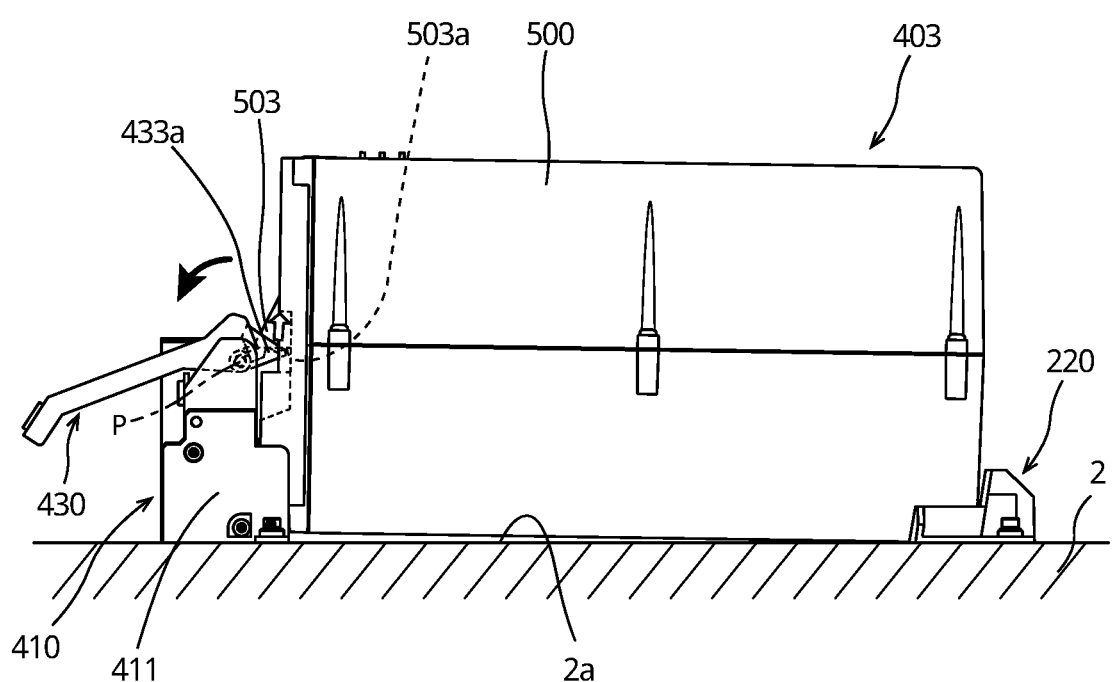
FIG. 29 is a side view illustrating detachment of the battery device from the battery mounting unit.

Next, an operation of attaching/detaching the battery device 403 to/from the battery mounting unit 401 having the configuration described above will be described with reference to FIGS. 28 through 30. FIG. 28 is a side view illustrating attachment of the battery device 403 to the battery mounting unit 401. FIG. 29 is a side view illustrating detachment of the battery device 403 from the battery mounting unit 401.

The second projection 502 of the casing 500 of the battery device 403 is first inserted in the recess 220a of the second retainer 220 of the battery mounting unit 401.

Thereafter, as illustrated in FIG. 28, the lever 430 is caused to rotate toward the casing 500 of the battery device 403 (see the solid arrow) so that the second protrusion 434 of the lever 430 is pushed downward against the second load receiving surface 504c of the first projection 501 of the casing 500 (see the white arrow). Accordingly, the external terminals 110 of the battery device 403 are fitted to the connection terminals 13 of the first retainer 410 of the battery mounting unit 401.

At this time, with the "principle of leverage" by the lever 430, the external terminals 110 of the battery device 403 can be easily fitted to the connection terminals 13 of the battery mounting unit 401.

By rotating the lever 430 to a position at which the arm 431 extends along the casing 500 of the battery device 403, the external terminals 110 of the battery device 403 and the connection terminals 13 of the first retainer 410 are in a fitted state (see FIG. 25). This state of the lever 430 is a fixed state. In this embodiment, as illustrated in FIG. 25, while the lever 430 is in the fixed state, the lock stopper portion 442 of the lock mechanism 440 is engaged with the lever end 438 of the lever 430 so that the lever 430 is thereby locked with respect to the connection terminal holder 411.

Accordingly, with the battery device 403 being mounted to the battery mounting unit 401, the battery device 403 can be retained by the first retainer 410 and the second retainer 220 of the battery mounting unit 401. In the manner described above, in the state where the battery device 403 is mounted to the battery mounting unit 401, electric power is supplied from the battery device 403 to the apparatus 2 through the external terminals 110 of the battery device 403 and the connection terminals 13 of the battery mounting unit 401.

In detaching the battery device 403 from the battery mounting unit 401, the lock operating portion 443 is first pushed toward the battery device 403. Then, the lock mechanism 440 rotates about the rotation shaft, and the lock stopper portion 442 moves downward. Accordingly, the lock stopper portion 442 and the lever end 438 of the lever 430 are disengaged. In this state, as illustrated in FIG. 29, the lever 430 is caused to rotate in the direction in which the lever 430 moves away from the casing 500 of the battery device 403, that is, the direction in which the lever 430 falls (see the solid arrow). Accordingly, the first protrusion 433a of the lever 430 contacts the first load receiving surface 503a of the protrusion 503 of the casing 500, and the first protrusion 433a applies an upward force to the first load receiving surface 503a (see the white arrow). At this time, a biasing force of the lever biasing force application portion 432 disposed on the lever 430 is applied in the direction in which the lever 430 falls, and thus, the battery device 403 can be easily detached.

Figure 30:
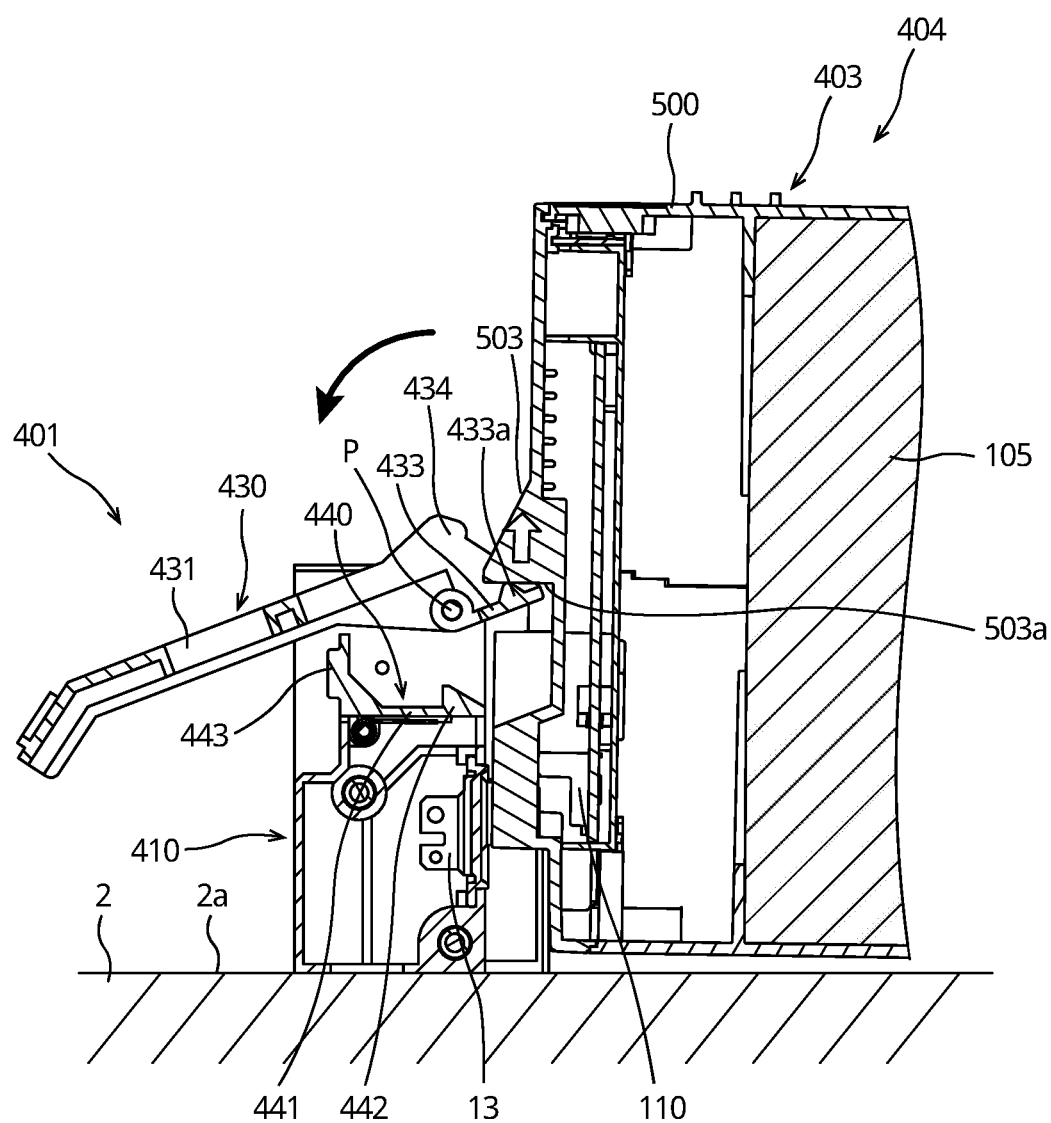
FIG. 30 is an enlarged partial view illustrating detachment of external terminals of the battery device from connection terminals of the battery mounting unit.

With such rotation of the lever 430, as illustrated in FIG. 30, the first protrusion 433a of the lever 430 moves one longitudinal end (first end) of the battery device 403 away from the apparatus 2 such that fitting between the external terminals 110 of the battery device 403 and the connection terminals 13 of the battery mounting unit 401 is canceled.

At this time, with the "principle of leverage" by the lever 430, fitting between the external terminals 110 of the battery device 403 and the connection terminals 13 of the battery mounting unit 401 can be easily canceled, and the first end of the battery device 403 can be easily moved away from the apparatus 2.

By rotating the lever 430 to the position at which the arm 431 falls, fitting between the external terminals 110 of the battery device 403 and the connection terminals 13 of the first retainer 410 is canceled, and the first end of the battery device 403 is separated from the apparatus 2, that is, the lever 430 comes to be in the unfixed state (see FIGS. 29 and 30). This state of the lever 430 is the unfixed state.

As in the configuration of the second embodiment, the configuration of the third embodiment enables the battery device 403 to be easily separated from the battery mounting unit 401.

Specifically, this embodiment includes the first protrusion 433a serving as the first action part that contacts the protrusion 503 of the battery device 403 and applies a force to the battery device 403 through the first load receiving surface 503a of the protrusion 503 such that the battery device 403 slides in a direction in which fitting between the external terminals 110 and the connection terminals 13 is canceled, when the lever 430 rotates about the fulcrum P in one direction by a force applied to the gripper 435.

Accordingly, with the rotation of the lever 430, the first protrusion 433a of the lever 430 can apply a force to the first load receiving surface 503a of the protrusion 503 of the battery device 403 in a direction in which the battery device 403 is separated from the first retainer 410. Thus, with the rotation of the lever 430, the battery device 403 can be easily separated from the battery mounting unit 401.

In addition, this embodiment further includes the second protrusion 434 serving as the second action part that enters the recess 504 of the battery device 403 and applies a force to the battery device 403 through the second load receiving surface 504c of the first projection 501 such that the battery device 403 slides in a direction in which the external terminals 110 are fitted to the connection terminals 13, when the lever 430 rotates about the fulcrum P in the other direction by a force applied to the gripper 435.

Accordingly, with the rotation of the lever 430, the second protrusions 434 of the lever 430 can apply a force to the second load receiving surface 504c of the first projection 501 of the battery device 403 in a direction in which the battery device 403 is mounted to the first retainer 410. Thus, with the rotation of the lever 430, the battery device 403 can be easily mounted to the battery mounting unit 401.

In this embodiment, the first protrusion 433a is disposed closer to the apparatus 2 than the second protrusion 434 in the lever 430.

As in the configuration of the second embodiment, in the configuration of the third embodiment, the direction in which the battery device 403 moves away from the apparatus 2 is a direction in which the external terminals 110 of the battery device 403 are slidable relative to the connection terminals 13 of the first retainer 410 of the battery mounting unit 401. Thus, since the first protrusion 433a is provided on the lever 430, the first protrusion 433a enables the battery device 403 to be more easily separated from the apparatus 2. Specifically, since the first protrusion 433a is located closer to the apparatus 2 than the second protrusions 434, rotation of the lever 430 can cancel fitting between the external terminals 110 of the battery device 403 and the connection terminals 13 while easily lifting the battery device 403 from the apparatus 2.

Other Embodiments

The embodiments of the present teaching have been described above, but the above embodiments are merely examples for carrying out the present teaching. Thus, the teaching is not limited to the embodiments, and the embodiments may be modified as necessary within a range not departing from the gist of the teaching.

In each of the embodiments, the connection terminals 13 provided in the connection terminal holder 11, 211, 411 of the battery mounting unit 1, 201, 401 have the flat plate shapes, and the external terminals 110 of the battery device 3, 203, 403 have U shapes sandwiching the connection terminals 13 therein in the thickness direction. Alternatively, the external terminals of the battery device may have flat plate shapes with the connection terminals of the battery mounting unit having U shapes sandwiching the external terminals therein in the thickness direction.

One of the external terminals of the battery device or the connection terminals of the battery mounting unit may have pin shapes with the other one of the external terminals of the battery device or the connection terminals of the battery mounting unit having shapes capable of fitting to the pin-shaped terminals.

That is, the external terminals of the battery device and the connection terminals of the battery mounting unit may have any shapes as long as the terminals are capable of fitting to one another and are slidable at least in one direction.

In the first and second embodiments, the holder body 12, 212 of the connection terminal holder 11, 211 has the opening 12e, 212e. Alternatively, the holder body may have no opening. In the first embodiment, the holder upper portion 12a of the holder body 12 tilts downward toward the side opposite to the holder side portion 12c. However, the present teaching is not limited to this example, and the holder upper portion 12a may have any shape as long as the holder upper portion 12a does not interfere with the lever 30 when the lever 30 rotates.

In the first embodiment, the lever 30 of the battery mounting unit 1 includes the pair of arms 31. The pair of arms 31 is connected to the gripper 35 such that the action parts 32 of the pair of arms 31 face each other with the battery device 3 interposed therebetween in the state where the external terminals 110 of the battery device 3 are fitted to the connection terminals 13 of the battery mounting unit 1. Alternatively, the action parts of the pair of arms may not face each other with the battery device interposed therebetween. The lever may include only one arm.

In the first and second embodiments, the lever 30, 230 includes the bent portion 31a, 231a in the arm 31, 231. Alternatively, the lever may include no bent portion in the arm. The lever may have any structure as long as fitting between the external terminals of the battery device and the external terminal of the battery mounting unit can be canceled in accordance with the "principle of leverage."

In each of the embodiments, the lever 30, 230, 430 rotates about the fulcrum. Alternatively, the lever may not include the shaft rotatably supporting the lever as long as rotation in accordance with the "principle of leverage" is obtained. For example, the lever may have a structure that obtains rotation in accordance with the "principle of leverage" through elastic deformation.

In the first and third embodiments, the battery mounting unit 1, 401 includes the lock mechanism 40, 440 that locks the lever 30, 430. Alternatively, the battery mounting unit may include no lock mechanism.

In the first and third embodiments, the lock mechanism 40, 440 is disposed on the holder upper portion 12a, 412a of the holder body 12, 412 of the connection terminal holder 11, 411. The lock mechanism, however, may be disposed at any location on the holder body as long as the lock mechanism is capable of locking the lever.

In the first embodiment, the lock mechanism 40 locks the gripper 35 of the lever 30. In the third embodiment, the lock mechanism 440 locks the lever end 438 of the lever 430. The lock mechanism, however, may lock the gripper or a portion except for the lever end as long as the lock mechanism is capable of locking the lever. For example, the lock mechanism may lock the arm of the lever.

In the first embodiment, the lock mechanism 40 includes the lock portion 41 and the biasing force application portion 42. In the third embodiment, the lock mechanism 440 includes the lock mechanism body 441 and the lock biasing force application portion 444. The lock mechanism, however, may have any structure as long as the lock mechanism is capable of locking the lever.

In the first and third embodiments, the lever 30, 430 and the lock mechanism 40, 440 are disposed in the connection terminal holder 11, 411. Alternatively, at least one of the lever or the lock mechanism may be disposed separately from the connection terminal holder.

In the second embodiment, the lever 230 includes the pair of first protrusions 232 and the second protrusion 233. In the third embodiment, the lever 430 includes the first protrusion 433a and the pair of second protrusions 434. Alternatively, the lever may include three or more first protrusions. The lever may include three or more second protrusions.

In the second and third embodiments, the battery device 203, 403 includes the recess constituting the first load receiving surface 303a, 503a and the second load receiving surface 304a, 504a. Unlike these embodiments, the recess, however, does not need to be provided in the battery device as long as the battery device has the first load receiving surface and the second load receiving surface. That is, the battery device may include a structure except for the recess, such as a projection or a notch, as long as the battery device has the first load receiving surface engageable with the first protrusions 232, 433a of the battery mounting unit 201, 401 and the second load receiving surface engageable with the second protrusion 233, 434.

In the second and third embodiments, the lever 230, 430 includes the gripper 235, 435. Alternatively, the lever may include no gripper.

In the second embodiment, the lever may be configured to be locked by a lock mechanism having a function similar to the function of the lock mechanism 40 of the first embodiment or the lock mechanism 440 of the third embodiment.

In the second and third embodiments, the lever 230, 430 is located at a position extending along the casing 300, 500 of the battery device 203, 403 in the fixed state. The lever, however, may be located at any position as long as the casing can be fixed to the apparatus in the fixed state.

In the third embodiment, the lever biasing force application portion 432 is disposed between the lever support 413 and the holder connection portions 431e at one end of the pair of holder connection portions 431e. The lever biasing force application portion, however, may be disposed at any location as long as the lever biasing force application portion biases to cause the lever to rotate about the fulcrum P to the direction opposite to the side at which the battery device is mounted to the connection terminal holder.

In each of the embodiments, the lever 30, 230, 430 of the battery mounting unit 1, 201, 401 moves one longitudinal end of the battery device 3, 203, 403 away from the apparatus 2 by rotation about the fulcrum P to thereby cancel fitting between the external terminals 110 of the battery device 3, 203, 403 and the connection terminals 13 of the battery mounting unit 1, 201, 401. Alternatively, the lever may be configured to rotate about the fulcrum to cause one longitudinal end of the battery device away from the connection terminal holder in the longitudinal direction. In the embodiments, since the external terminals of the battery device and the connection terminals of the battery mounting unit are also slidable in the longitudinal direction, the configuration of the lever described above can also cancel fitting between the external terminals of the battery device and the connection terminals of the battery mounting unit. That is, the lever may have any configuration as long as the external terminals of the battery device are caused to slide with respect to the connection terminals of the battery mounting unit by rotation of the lever about the fulcrum so that fitting between the external terminals of the battery device and the connection terminals of the battery mounting unit can be canceled.

In the case where the battery device is moved away from the connection terminal holder in the longitudinal direction as described above, it is necessary to detach or move the retainer for holding the other longitudinal end of the battery device beforehand.

In the case where the battery device is moved away from the connection terminal holder in the longitudinal direction as described above, the action part of the lever only needs to apply a force to the battery device such that the external terminals of the battery device are caused to slide with respect to the connection terminals of the battery mounting unit to cancel fitting between the external terminals of the battery device and the connection terminals of the battery mounting unit. Thus, the action part does not need to be located between the battery device and the apparatus.

In each of the embodiments, the battery device 3, 203, 403 in the state of being mounted to the battery mounting unit 1, 201, 401 has a rectangular parallelepiped shape in which the length L is larger than the height H and the height H is larger than the width W. Alternatively, in the battery device, the width may be larger than the height. In the battery device, the height may be larger than the length. The battery device is not limited to the rectangular parallelepiped shape, and may have any shape.

In each of the embodiments, the external terminals 110 are disposed at one longitudinal end of the battery device 3, 203, 403. Alternatively, the external terminals may be disposed at any location in the battery device. In a case where the external terminals are disposed at a location except for one longitudinal end of the battery device, the connection terminals of the battery mounting unit only need to be disposed at a location at which the connection terminals can fit to the external terminals of the battery device.

In each of the embodiments, the battery device 3, 203, 403 includes a lithium ion battery that is a secondary battery. Alternatively, the battery device may include a secondary battery having another configuration, or may include a primary battery.

INDUSTRIAL APPLICABILITY

The present teaching is applicable to a battery mounting unit which is configured to be attached to an apparatus that receives electric power from a battery device and to/from which the battery device is attachable and detachable.

DESCRIPTION OF REFERENCE CHARACTERS 1, 201, 401 battery mounting unit
2 apparatus
2a attachment surface
3, 203, 403 battery device
4, 204, 404 power supply unit
10, 210, 410 first retainer
11, 211, 411 connection terminal holder
12, 212, 412 holder body
13 connection terminal
15 housing recess
20, 220 second retainer (retainer)
30, 230, 430 lever
31, 231, 431 arm
31a, 231 bent portion (connection portion)
32 action part (first action part)
35, 235, 435 gripper
35a opening
35b peripheral portion (engagement portion)
40 lock mechanism
41 lock portion
42 biasing force application portion
100, 300, 500 casing
101, 301, 501 first projection
101a, 301a, 501a slit
102, 302, 502 second projection
105 lithium ion battery
110 external terminal
213, 413 lever support
232, 433a first protrusion (first action part)
233, 434 second protrusion (second action part)
303 first recess
303a first load receiving surface
304 second recess
304a second load receiving surface
431e holder connection portion (connection portion)
438 lever end (engagement portion)
440 lock mechanism
441 lock mechanism body
442 lock stopper portion
443 lock operating portion
503 protrusion
503a first load receiving surface
504 recess
504c second load receiving surface
P fulcrum

The invention claimed is:

1. A battery mounting unit configured to be attached to an apparatus that receives electric power from a battery device having an external terminal, the battery device being attachable and detachable to/from the battery mounting unit, the battery mounting unit comprising:

a connection terminal configured to fit to the external terminal and having a shape along which the external terminal is slidable at least in one direction; and a lever rotatable about a fulcrum, the lever being located at a side at which the connection terminal is located when seen from the battery device in a state where the external terminal is fitted to the connection terminal, wherein one of the external terminal or the connection terminal is configured to be elastically deformable to allow the external terminal and the connection terminal to fit to each other by sandwiching the other one of the external terminal or the connection terminal between the one of the external terminal or the connection terminal, the lever includes
an arm including the fulcrum and a first action part, the first action part being located closer to the battery device than the fulcrum in the state where the external terminal of the battery device is fitted to the connection terminal and being configured to contact the battery device when the lever rotates about the fulcrum, and a gripper connected to a side of the arm opposite to the first action part with respect to the fulcrum, and when the lever rotates about the fulcrum by a force applied to the gripper, the first action part applies a force to the battery device such that the battery device slides in a direction in which fitting between the external terminal and the connection terminal is canceled.

2. The battery mounting unit according to claim 1, wherein the lever rotates about the fulcrum to be switched between a fixed state where the battery device is fixed to the apparatus with the external terminal fitted to the connection terminal and an unfixed state where fitting between the external terminal and the connection terminal is canceled.

3. The battery mounting unit according to claim 1, wherein the lever includes a first protrusion serving as the first action part, and the first action part is configured to apply a force to the battery device through a first load receiving surface of the battery device such that the battery device slides in a direction in which fitting between the external terminal and the connection terminal is canceled when the lever rotates about the fulcrum in a first direction by a force applied to the gripper.

4. The battery mounting unit according to claim 1, wherein the lever includes a second protrusion serving as a second action part, and the second action part is configured to apply a force to the battery device through a second load receiving surface of the battery device such that the battery device slides in a direction in which the external terminal is fitted to the connection terminal when the lever rotates about the fulcrum in a second direction by a force applied to the gripper.

5. The battery mounting unit according to claim 4, wherein the first direction in which the external terminal is slidable with respect to the connection terminal is a direction in which the battery device moves away from the apparatus, and the first protrusion is disposed at a location closer to the apparatus than the second protrusion in the lever.

6. The battery mounting unit according to claim 1, wherein the first direction in which the external terminal is slidable with respect to the connection terminal is a direction in which the battery device moves away from the apparatus, the first action part is located between the battery device and the apparatus in the state where the external terminal of the battery device is fitted to the connection terminal, and the lever is configured such that when the lever rotates about the fulcrum by a force applied to the gripper, the first action part applies a force to the battery device in a direction in which the battery device moves away from the apparatus.

7. The battery mounting unit according to claim 1, wherein the arm includes a connection portion between the first action part and the gripper when seen in a direction orthogonal to a rotation plane formed by rotation of the lever, and the fulcrum is located at the connection portion.

8. The battery mounting unit according to claim 1, wherein the lever includes a pair of the arms, and the pair of arms is connected to the gripper such that the first action parts of the pair of arms face each other with the battery device interposed therebetween in the state where the external terminal of the battery device is fitted to the connection terminal.

9. The battery mounting unit according to claim 1, further comprising a lock mechanism configured to lock the lever in the state where the external terminal of the battery device is fitted to the connection terminal.

10. The battery mounting unit according to claim 9, wherein the lock mechanism includes
a lock portion, and
a biasing force application portion configured to apply a biasing force to the lock portion, and the lock mechanism is configured to be in an unlocked state where the lever is unlocked by pushing the lock portion downward, and to be in a locked state where the lever is locked by pushing the lock portion upward by a biasing force of the biasing force application portion.

11. The battery mounting unit according to claim 9, wherein the lock mechanism is disposed to enable locking of the gripper of the lever.

12. The battery mounting unit according to claim 11, wherein the gripper includes an engagement portion engageable with the lock mechanism.

13. The battery mounting unit according to claim 9, further comprising a connection terminal holder configured to hold the connection terminal, wherein the lever is rotatably disposed on the connection terminal holder, and the lock mechanism is disposed on the connection terminal holder to enable locking of the lever.

14. The battery mounting unit according to claim 13, wherein the lever is disposed such that the gripper overlaps the connection terminal holder when seen in a direction in which the apparatus and the battery device are arranged in the state where the external terminal of the battery device is fitted to the connection terminal, and the lock mechanism is disposed at a location overlapping the gripper of the lever when seen in the direction in which the apparatus and the battery device are arranged in the state where the external terminal of the battery device is fitted to the connection terminal.

15. The battery mounting unit according to claim 1, wherein a fitting force between the connection terminal and the external terminal of the battery device is larger than a load of the battery device.

16. The battery mounting unit according to claim 1, wherein the connection terminal is configured to fit the external terminal disposed in the battery device whose width or length is larger than a height of the battery device.

17. The battery mounting unit according to claim 1, further comprising a retainer configured to retain the battery device at a side opposite to the connection terminal with respect to the battery device in the state where the external terminal of the battery device is fitted to the connection terminal.

18. An electric apparatus configured to receive electric power from a battery device, the battery device including an external terminal, the electric apparatus comprising
the battery mounting unit according to claim 1.

19. A power supply unit comprising:
a battery device; and
the battery mounting unit according to claim 1, the battery mounting unit being configured such that the battery device is attachable and detachable to/from the battery mounting unit.

20. The power supply unit according to claim 19, wherein the battery device includes a secondary battery.

* * * * *